US012658097B2

(12) United States Patent
Kuang et al.

(10) Patent No.: US 12,658,097 B2
(45) Date of Patent: Jun. 16, 2026

(54) DISPLAY PANEL AND DISPLAY DEVICE

(71) Applicant: Xiamen Tianma Display Technology Co., Ltd., Xiamen (CN)

(72) Inventors: Jian Kuang, Xiamen (CN); Xingyao Zhou, Xiamen (CN); Yana Gao, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 19/007,342

(22) Filed: Dec. 31, 2024

(65) Prior Publication Data

US 2026/0065831 A1 Mar. 5, 2026

(30) Foreign Application Priority Data

Aug. 30, 2024 (CN) ......................... 202411216042.9

(51) Int. Cl.
*G09G 3/3266* (2016.01)
*G09G 3/20* (2006.01)

(52) U.S. Cl.
CPC ..................... *G09G 3/2092* (2013.01); *G09G 2310/0286* (2013.01); *G09G 2310/08* (2013.01); *G09G 2330/021* (2013.01)

(58) Field of Classification Search
CPC ......... G09G 3/2092; G09G 2310/0286; G09G 2310/08; G09G 2330/021; G09G 3/3266
See application file for complete search history.

(56) References Cited

U.S. PATENT DOCUMENTS

| | | | | |
|---|---|---|---|---|
| 9,412,307 | B2 * | 8/2016 | Kwon | G09G 3/3266 |
| 10,885,854 | B2 * | 1/2021 | Zou | G09G 3/3266 |
| 11,227,534 | B2 * | 1/2022 | Liu | G09G 3/3266 |
| 11,551,604 | B2 * | 1/2023 | Kim | G09G 3/3677 |
| 11,830,437 | B2 * | 11/2023 | Yokoyama | G09G 3/3266 |
| 11,847,966 | B2 * | 12/2023 | Zheng | G11C 19/28 |
| 11,847,973 | B2 * | 12/2023 | Jeong | G09G 3/3241 |
| 11,915,656 | B2 * | 2/2024 | Kim | G09G 3/3233 |
| 2012/0050234 | A1 * | 3/2012 | Jang | G09G 3/3225<br>345/204 |
| 2017/0154572 | A1 * | 6/2017 | Kim | G09G 3/3266 |
| 2017/0285817 | A1 * | 10/2017 | Mori | G06F 3/0446 |
| 2018/0301081 | A1 * | 10/2018 | Wang | G09G 3/3677 |
| 2020/0075113 | A1 * | 3/2020 | Yuan | G11C 19/28 |
| 2020/0082765 | A1 * | 3/2020 | Zhang | G09G 3/3266 |
| 2021/0327360 | A1 * | 10/2021 | Dong | G09G 3/3275 |
| 2021/0350733 | A1 * | 11/2021 | Liu | G09G 3/3266 |

(Continued)

*Primary Examiner* — Jose R Soto Lopez
(74) *Attorney, Agent, or Firm* — Anova Law Group, PLLC

(57) ABSTRACT

A display panel and a display device are provided. The display panel includes: a plurality of cascaded first shift registers. One of the plurality of first shift registers includes a first driving circuit, a first gating circuit and a second gating circuit. An output terminal of the i-th-level first driving circuit is electrically connected to an input terminal of the (i+1)-th-level first driving circuit, an input terminal of the i-th-level first gating circuit, and an input terminal of the i-th-level second gating circuit, respectively, where i≥1. One first gating circuit outputs a first gate control signal, and one second gating circuit outputs a second gate control signal. In one first shift registers of a same level, output times of effective pulses of the first gate control signal and the second gate control signal are different.

27 Claims, 23 Drawing Sheets

(56) References Cited

U.S. PATENT DOCUMENTS

| | | | | |
|---|---|---|---|---|
| 2021/0366358 | A1* | 11/2021 | Li | G11C 19/28 |
| 2022/0139312 | A1* | 5/2022 | Bai | G09G 3/3266<br>345/204 |
| 2022/0335875 | A1* | 10/2022 | Lai | G09G 3/3266 |
| 2023/0345763 | A1* | 10/2023 | Feng | H10K 59/1213 |
| 2023/0420064 | A1* | 12/2023 | Zhang | G11C 19/287 |
| 2024/0221674 | A1* | 7/2024 | Xiao | G09G 3/20 |
| 2024/0257712 | A1* | 8/2024 | Feng | G09G 3/32 |
| 2024/0379063 | A1* | 11/2024 | Xu | G09G 3/32 |
| 2024/0395201 | A1* | 11/2024 | Yuan | G09G 3/3266 |

* cited by examiner

DISPLAY PANEL AND DISPLAY DEVICE

CROSS-REFERENCE TO RELATED APPLICATION

This application claims the priority of Chinese Patent Application No. 202411216042.9, filed on Aug. 30, 2024, the content of which is incorporated herein by reference in its entirety.

TECHNICAL FIELD

The present disclosure generally relates to the field of display technology and, more particularly, relates to a display panel and a display device.

BACKGROUND

With the advancement of display technology, display panels are widely used in various display devices. By setting different refresh rates for different areas in a display panel, that is, a zone-by-zone frequency division technology, it is possible to effectively reduce power consumption while ensuring image quality. However, a gate drive circuit that supports this function needs to occupy a large frame space in the layout design, which poses a challenge to achieving a narrow frame design for the display panel.

SUMMARY

One aspect of the present disclosure provides a display panel. The display panel includes: a plurality of cascaded first shift registers. One of the plurality of first shift registers includes a first driving circuit, a first gating circuit and a second gating circuit. An output terminal of the i-th-level first driving circuit is electrically connected to an input terminal of the (i+1)-th-level first driving circuit, an input terminal of the i-th-level first gating circuit, and an input terminal of the i-th-level second gating circuit, respectively, where $i \geq 1$. One first gating circuit outputs a first gate control signal, and one second gating circuit outputs a second gate control signal. In one first shift registers of a same level, output times of effective pulses of the first gate control signal and the second gate control signal are different.

Another aspect of the present disclosure provides a display device. The display device includes a display panel. The display panel includes: a plurality of cascaded first shift registers. One of the plurality of first shift registers includes a first driving circuit, a first gating circuit and a second gating circuit. An output terminal of the i-th-level first driving circuit is electrically connected to an input terminal of the (i+1)-th-level first driving circuit, an input terminal of the i-th-level first gating circuit, and an input terminal of the i-th-level second gating circuit, respectively, where $i \geq 1$. One first gating circuit outputs a first gate control signal, and one second gating circuit outputs a second gate control signal. In one first shift registers of a same level, output times of effective pulses of the first gate control signal and the second gate control signal are different.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
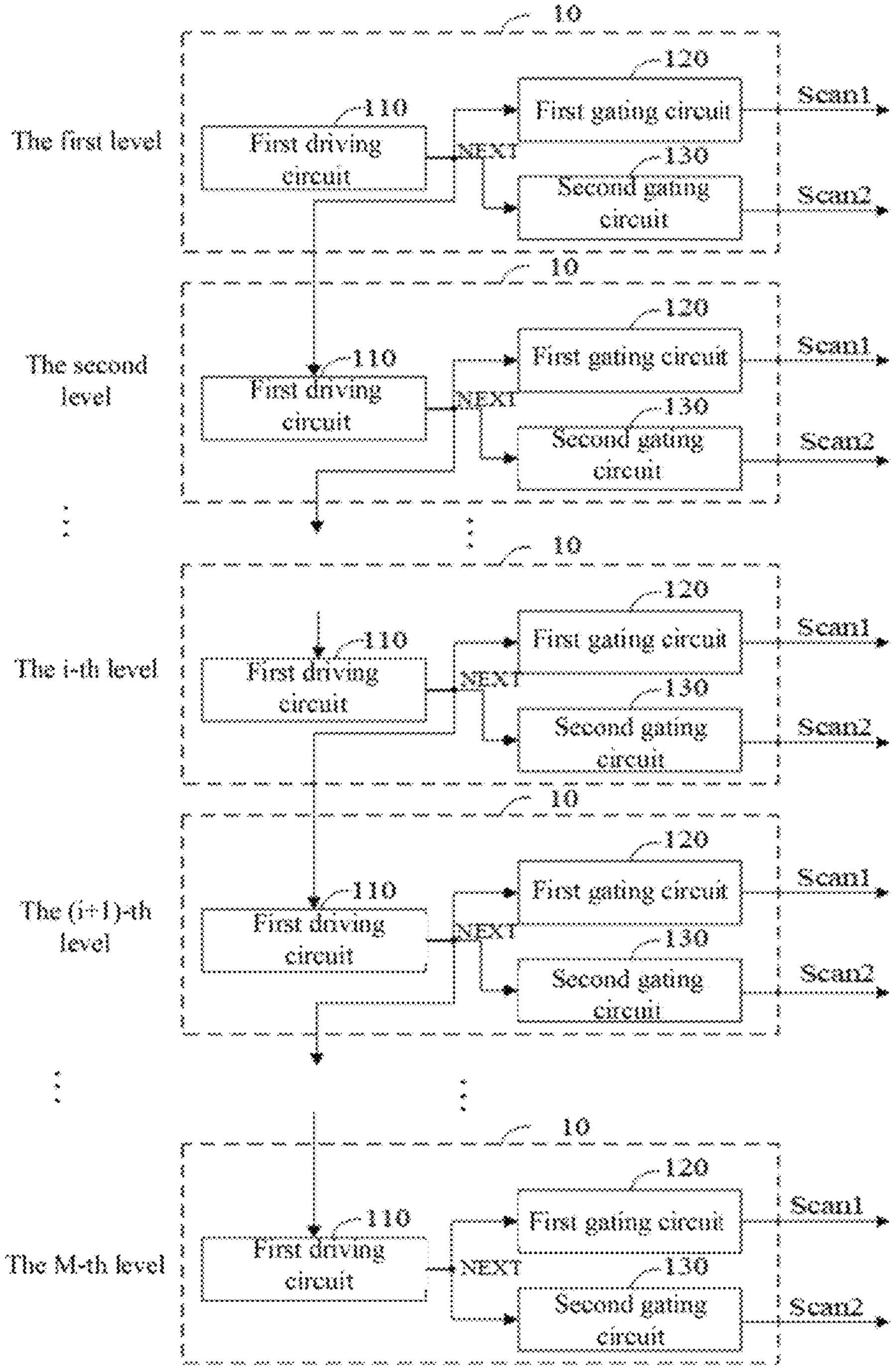
FIG. 1 illustrates an exemplary display panel consistent with various disclosed embodiments in the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted. Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width, and depth should be considered during practical fabrication.

In the present disclosure, terms such as "center", "longitudinal", "lateral", "length", "width", "thickness", "up", "down", "front", "back", "left", "right", "vertical", "horizontal", "top", "bottom", "inside", "outside", "clockwise", "counterclockwise", "axial", "radial", "circumferential", etc., indicate orientations or positional relationships based on the orientations or positional relationships shown in the accompanying drawings, and are only for the convenience of describing the present disclosure and simplifying the description, and do not indicate or imply that the device or element referred to must have a specific orientation, be constructed and operated in a specific orientation, and therefore should not be understood as limiting the present disclosure.

In the present disclosure, relational terms such as first and second are only used to distinguish one entity or operation from another entity or operation, and do not necessarily require or imply any such actual relationship between these entities or operations or order. Moreover, the terms "including", "comprising" or any other variants thereof are intended to cover non-exclusive inclusion, such that a process, method, article, or device that includes a series of elements includes not only those elements, but also those that are not explicitly listed or also include elements inherent to this process, method, article or equipment. If there are no more restrictions, the elements defined by the sentence "including . . . " do not exclude the existence of other same elements in the process, method, article, or equipment that includes the elements.

It should be understood that when describing the structure of a component, when a layer or region is referred to as being "on" or "above" another layer or another region, the layer or region may be directly on the other layer or region, or indirectly on the other layer or region, for example, layers/components between the layer or region and another layer or another region. And, for example, when the component is reversed, the layer or region may be "below" or "under" the other layer or region. In the present disclosure, the term "electrical connection" refers to that two components are directly electrically connected with each other, or the two components are electrically connected via one or more other components.

In the present disclosure, unless otherwise clearly specified and limited, the terms "installed", "connected", "fixed" and the like appear, should be understood in a broad sense. For example, it can be a fixed connection, a detachable connection, or an integrated connection; it can be a mechanical connection or an electrical connection; it can be a direct connection or an indirect connection through an intermediate medium, it can be the internal connection of two elements or the interaction relationship between two elements, unless otherwise clearly defined. For those skilled in the art, the specific meanings of the above terms in the present disclosure can be understood according to the specific circumstances.

In the present disclosure, when an element is referred to as being "fixed to" or "disposed on" another element, it may be directly on the other element or there may be an intermediate element. When an element is considered to be "connected to" another element, it may be directly connected to the other element or there may be an intermediate element at the same time. If present, the terms "vertical", "horizontal", "upper", "lower", "left", "right" and similar expressions are for illustrative purposes only and are not intended to be the only embodiment.

A gate drive circuit that supports a zone-by-zone frequency division function in a display panel occupies a large frame, making it difficult to achieve a narrow frame. The reason for the above phenomenon is that a pixel circuit requires multiple gate control signals, which will result in the need to set up many groups of shift register circuits in the display panel to output different gate control signals respectively. Also, since the display panel adds a gating circuit on the basis of an original gate drive circuit to achieve the zone-by-zone frequency division display function, it is necessary to add multiple gating circuits to achieve the control of multiple gate control signals, resulting in a more complex circuit structure and an increase in the number of transistors. Therefore, a larger layout space is required, resulting in an increase in the frame.

A shift register that is able to output different gate control signals at the same time may be used to achieve a narrow frame. Based on this, the present disclosure provides a display panel and a display device to at least partially alleviate the above problems. The display panel may include a plurality of cascaded first shift registers. Each first shift register may include a first driving circuit, a first gating circuit, and a second gating circuit. An output terminal of the i-th-level first driving circuit may be electrically connected to an input terminal of the (i+1)-th-level first driving circuit, an input terminal of the i-th-level first gating circuit, and an input terminal of the i-th-level second gating circuit, respectively, where $i \geq 1$. The first gating circuit may output a first gate control signal, and the second gating circuit may output a second gate control signal. In one first shift register of the same level, the output time of the effective pulses of the first gate control signal and the second gate control signal may be different. Since the first driving circuit and the second driving circuit multiplex the first driving circuit, there may be no need to set driving circuits for the first driving circuit and the second driving circuit respectively, thereby achieving a narrow frame.

One aspect of the present disclosure provides a display panel. In one embodiment shown in FIG. 1 which illustrates an exemplary display panel and FIG. 2 which illustrates a timing diagram of a first gate control signal Scan1 and a second gate control signal Scan2, the display panel may include a plurality of cascaded first shift registers 10. For description purposes only, one embodiment where the display panel includes M cascaded first shift registers 10 will be used as an example to illustrate the present disclosure Each first shift register 10 may include a first driving circuit 110, a first gating circuit 120, and a second gating circuit 130. The output terminal NEXT of the i-th-level first driving circuit 110 may be electrically connected to the input terminal of the (i+1)-th-level first driving circuit 110, the input terminal of the i-th-level first gating circuit 120, and the input terminal of the i-th-level second gating circuit 130 respectively, where i≥1. The i-th-level first driving circuit 110 refers to the first driving circuit 110 of the i-th-level first shift register 10, the (i+1)-th-level first driving circuit 110 refers to the first driving circuit 110 of the i+1-th-level first shift register 10, the i-th-level first gating circuit 120 refers to the first gating circuit 120 of the i-th-level first shift register 10, and the i-th-level second gating circuit 130 refers to the second gating circuit 130 of the i-th-level first shift register 10.

Figure 2:
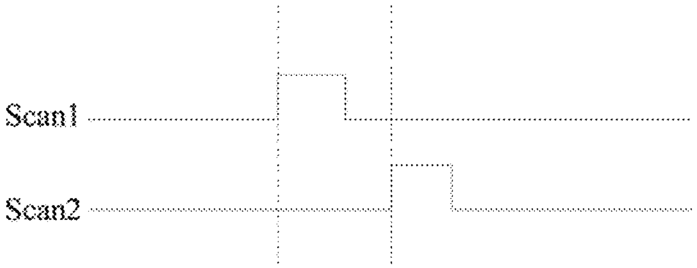
FIG. 2 illustrates a timing diagram of a first gate control signal and a second gate control signal consistent with various disclosed embodiments in the present disclosure.

The first gating circuits 120 may output the first gate control signals Scan1. The second gating circuits 130 may output the second gate control signals Scan2. In one first shift register 10 of the same level, the output time of the effective pulse of the first gate control signal Scan1 and the second gate control signal Scan2 may be different. The output time of the effective pulse of the gate control signal (including the first gate control signal Scan1 and the second gate control signal Scan2) may be understood as the time when the gate control signal jumps from the non-enable level to the enable level. Exemplarily, the gate control signal may include a high level and a low level. When the gate control signal is a signal transmitted to the gate of an N-type transistor, the enable level of the gate control signal may be a high level, and the output time of the effective pulse may be the starting time of the high level. When the gate control signal is a signal transmitted to the gate of a P-type transistor, the enable level of the gate control signal may be a low level, and the output time of the effective pulse may be the starting time of the low level. For example, as shown in FIG. 2, the non-enable levels of the first gate control signal Scan1 and the second gate control signal Scan2 may both be low levels, the enable levels of the first gate control signal Scan1 and the second gate control signal Scan2 may both be high levels, and the output time of the effective pulse of the first gate control signal Scan1 and the second gate control signal Scan2 may be the moment when the signal jumps from a low level to a high level. In the application, the enable levels of the first gate control signal Scan1 and the second gate control signal Scan2 may be low levels, and the non-enable levels may be high levels, respectively, which are not limited here.

Optionally, in some embodiments, the effective pulses of the first gate control signal Scan1 and the second gate control signal Scan2 may overlap. Optionally, in some other embodiments, the effective pulses of the first gate control signal Scan1 and the second gate control signal Scan2 may not overlap with each other, as shown in FIG. 2. In the application, it may be set accordingly according to specific needs, which is not limited here.

The output terminal NEXTNEXT of the first drive circuit 110 outputs the drive signal SNEXT. The first gating circuit 120 may be used to select and output the first gate control signal Scan1 according to the drive signal SNEXT. The second gating circuit 130 may be used to select and output the second gate control signal Scan2 according to the drive signal SNEXT. Optionally, the first gating circuit 120 and the second gating circuit 130 may output the first gate control signal Scan1 and the second gate control signal Scan2 in time-sharing according to the drive signal SNEXT to realize the zone-by-zone frequency division function.

In the present disclosure, taking the display panel shown in FIG. 1 including M first shift registers 10 with M>1 as an example, the display panel may include M first driving circuits 110, M first gating circuits 120 and M second gating circuits 130, and may be able to provide two kinds of gate control signals, namely M first gate control signals Scan1 and M second gate control signals Scan2, to realize the zone-by-zone frequency division function. In one display panel in the existing technologies, to realize the function of the display panel shown in FIG. 1, it is necessary to set 2M driving circuits and M or 2M gating circuits, where the M driving circuits and M gating circuits jointly provide M first gate control signals Scan1 and the remaining M driving circuits and the remaining M gating circuits jointly provide M second gate control signals Scan2. Compared with the display panel in the existing technologies, in the present embodiment, the number of driving circuits may be reduced, which is helpful in realizing a narrow frame.

Also, in the display panel provided by the present disclosure, in the first shift register 10 of the same level, the first gating circuit 120 and the second gating circuit 130 may be electrically connected to the first driving circuit 110 respectively, and the first gate control signal Scan1 may be output through the first gating circuit 120, and the second gate control signal Scan2 may be output through the second gating circuit 130. The display panel may provide the first gating circuit 120 and the second gating circuit 130 with the driving signal SNEXT through the first driving circuit 110, respectively, such that the first gating circuit 120 and the second gating circuit 130 multiplex the first driving circuit 110. The output time of the effective pulses of the first gate control signal Scan1 and the second gate control signal Scan2 may be different, and the first gating circuit 120 and the second gating circuit 130 may select to output two gate control signals, which may be applied to the zone-by-zone frequency division scenario of the display panel. Compared with the display panel with zone-by-zone frequency division function in the existing technologies, in the present disclosure, there may be not need to set driving circuits for the first gating circuit 120 and the second gating circuit 130 respectively, thereby reducing the number of driving circuits, reducing the occupancy of the frame, and realizing a narrow frame.

Figure 3:
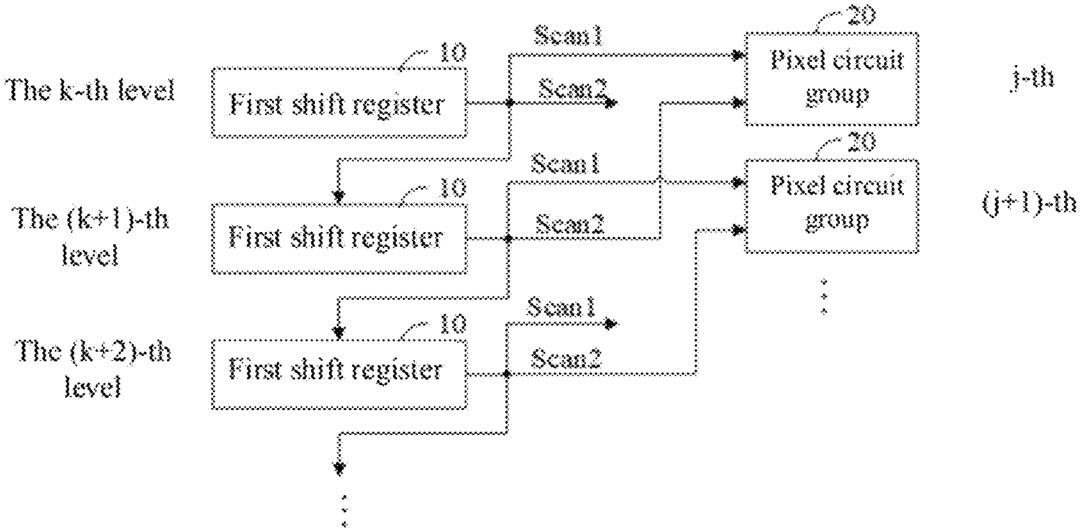
FIG. 3 illustrates another exemplary display panel consistent with various disclosed embodiments in the present disclosure.

In some embodiments shown in FIG. 3 which is a schematic diagram of the structure of a display panel, the display panel may further include a plurality of pixel circuit groups 20. Each pixel circuit group 20 may include at least one row of pixel circuits. The number of rows of pixel circuits included in each pixel circuit group 20 may be 1, 2, 3 or other values greater than 3, and may be set according to the driving mode of the display panel, which is not limited here.

A first control terminal of the j-th pixel circuit group 20 may be electrically connected to the output terminal of the k-th first gating circuit 120, and the second control terminal of the j-th pixel circuit group 20 may be electrically connected to the output terminal of the (k+N)-th second gating circuit 130, where j, k, N≥1. Exemplarily, each row of pixel circuits may be configured with a first signal line and a second signal line, and the first control terminal of each row of pixel circuits in the j-th pixel circuit group 20 may be electrically connected to the output terminal of the k-th-level first gating circuit 120 through the first signal line, to achieve the transmission of the first gate control signal Scan1. The second control terminal of each row of pixel circuits in the j-th pixel circuit group 20 may be electrically connected to the output terminal of the (k+N)-th-level second gating circuit 130 through the second signal line to achieve the transmission of the second gate control signal Scan2.

In one embodiment shown in FIG. 3, N may be 1. For example, the first control terminal of the first pixel circuit group 20 may be electrically connected to the output terminal of the first gating circuit 120 in the first-level first shift register 10, and the first control terminal of the first pixel circuit group 20 may receive the first gate control signal Scan output by the first-level first gating circuit 120. The second control terminal of the first pixel circuit group 20 may be electrically connected to the output terminal of the second gating circuit 130 in the second-level first shift register 10, and the second control terminal of the first pixel circuit group 20 may receive the second gate control signal Scan2 output by the second-level second gating circuit 130. For another example, the first control terminal of the second pixel circuit group 20 may be electrically connected to the output terminal of the first gating circuit 120 in the second-level first shift register 10, and the first control terminal of the second pixel circuit group 20 may receive the first gate control signal Scan1 output by the second-level first gating circuit 120. The second control terminal of the second pixel circuit group 20 may be electrically connected to the output terminal of the second gating circuit 130 in the third-level first shift register 10, and the second control terminal of the second pixel circuit group 20 may receive the second gate control signal Scan2 output by the third-level second gating circuit 130. FIG. 3 is only used as an example for illustrating the present disclosure, and does not limit the scope of the present disclosure. In some other embodiments, N may also be 2, 3 or other values, which are not limited here.

Figure 4:
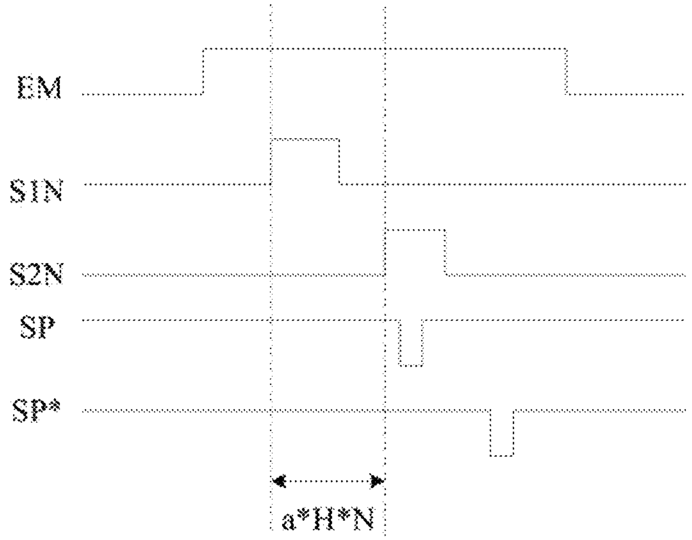
FIG. 4 illustrates a timing diagram of multiple signals of a pixel circuit consistent with various disclosed embodiments in the present disclosure.

FIG. 4 is a timing diagram of a gate control signal received by a first control terminal and a gate control signal received by a second control terminal of a pixel circuit. As shown in FIG. 4, within a display cycle of the display panel, for the same pixel circuit, the gate control signal received by the first control terminal, such as the first gate control signal Scan1, and the gate control signal S2N received by the second control terminal, such as the second gate control signal Scan2, may have different effective pulse start times. For example, for the same pixel circuit, the effective pulse start time of the first control terminal receiving the first gate control signal Scan1 may be earlier than the effective pulse start time of the second control terminal receiving the second gate control signal Scan2. Optionally, the effective pulse of the first control terminal receiving the first gate control signal Scan1 may not overlap with the effective pulse of the second control terminal receiving the second gate control signal Scan2. For ease of description, in the present disclosure, the gate control signal received by the first control terminal of the pixel circuit is recorded as S1N, and the gate control signal received by the second control terminal is recorded as S2N.

In the display panel provided by the present disclosure, the output terminal of the k-th-level first gating circuit 120 may be electrically connected to the first control terminal of the j-th pixel circuit group 20, and the output terminal of the (k+N)-th-level second gating circuit 130 may be electrically connected to the second control terminal of the j-th pixel circuit group 20, such that the pixel circuit group 20 may be driven by the first gate control signal Scan and the second gate control signal Scan2 respectively to meet the driving requirements of the pixel circuit.

Figure 5:
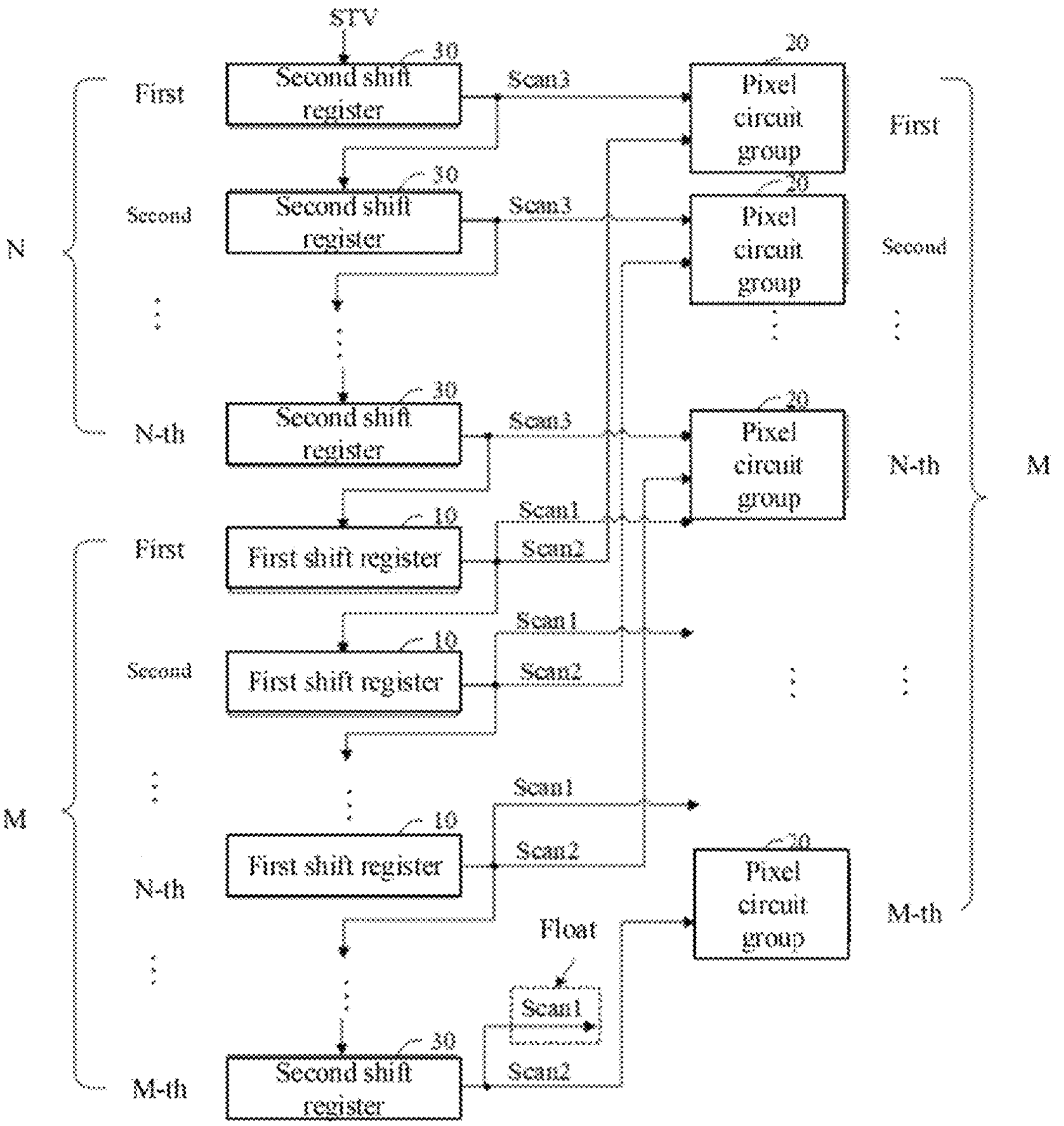
FIG. 5 illustrates another exemplary display panel consistent with various disclosed embodiments in the present disclosure.
Figure 6:
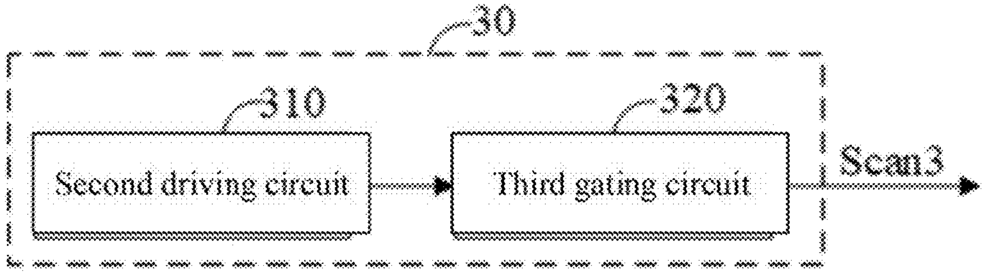
FIG. 6 illustrates an exemplary second shift register consistent with various disclosed embodiments in the present disclosure.

In one embodiment shown in FIG. 5 which is a schematic diagram of the structure of a display panel and FIG. 6 which is a schematic diagram of the structure of a second shift register 30, the display panel may further include N cascaded second shift registers 30, and each second shift register 30 may include a second drive circuit 310 and a third gating circuit 320. The input terminal of the first-level second drive circuit 310 may receive the start signal STV, the output terminal of the p-th-level second drive circuit 310 may be electrically connected to the input terminal of the (p+1)-th-level second drive circuit 310 and the input terminal of the p-th-level third gating circuit 320, respectively. The output terminal of the N-th-level second drive circuit 310 may be also electrically connected to the input terminal of the first-level first drive circuit 110, where 1≤p<N. The third gating circuit 320 may output a third gate control signal Scan3. The first control terminal of the q-th pixel circuit group 20 may be electrically connected to the output terminal of the q-th-level third gating circuit 320, where 1≤q≤N and k=j−N>0. That is, the first control terminal of the j-th pixel circuit group 20 may be electrically connected to the output terminal of the (j-N)-h-level first gating circuit 120, and the second control terminal of the j-th pixel circuit group 20 may be electrically connected to the output terminal of the j-th-level second gating circuit 130, where j>N.

In one embodiment shown in FIG. 5, the display panel may include M cascaded first shift registers 10, N cascaded second shift registers 30 and M pixel circuit groups 20. The input terminal of the first-level second driving circuit 310 may receive the start signal STV; the output terminal of the first-level second driving circuit 310 may be electrically connected to the input terminal of the second-level second driving circuit 310 and the input terminal of the first-level third gating circuit 320, respectively. The output terminal of the second-level second driving circuit 310 may be electrically connected to the input terminal of the third-level second driving circuit 310 and the input terminal of the second-level third gating circuit 320, respectively. The same may go for the (N−1)-th-level second driving circuit 310. The output terminal of the N-th-level second driving circuit 310 may be electrically connected to the input terminal of the N-th-level third gating circuit 320 and the input terminal of the first-level first driving circuit 110, respectively. The first control terminal of the first pixel circuit group 20 may be electrically connected to the output terminal of the first-level third gating circuit 320, the second control terminal of the first pixel circuit group 20 may be electrically connected to the output terminal of the first-level second gating circuit 130, the first control terminal of the second pixel circuit group 20 may be electrically connected to the output terminal of the second-level third gating circuit 320, the second control terminal of the second pixel circuit group 20 may be electrically connected to the output terminal of the second-level second gating circuit 130, and so on, to the N-th pixel circuit group 20. The first control terminal of the (N+1)-th pixel circuit group 20 may be electrically connected to the output terminal of the first-level first gating circuit 120, the second control terminal of the (N+1)-th pixel circuit group 20 may be electrically connected to the output terminal of the (N+1)-th second gating circuit 130, the first control terminal of the (N+2)-th pixel circuit group 20 may be electrically connected to the output terminal of the second-level first gating circuit 120, the second control terminal of the (N+2)-th pixel circuit group 20 may be electrically connected to the output terminal of the (N+2)-th second gating circuit 130, and so on until the M-th pixel circuit group 20.

Exemplarily, the plurality of cascaded second shift registers 30 and the plurality of cascaded first shift registers 10 may be arranged along the column direction of the pixel circuit. For example, taking the N cascaded second shift registers 30 and the M cascaded first shift registers 10 shown in FIG. 5 as an example, the N second shift registers 30 and the M first shift registers 10 may be located in the same column, and the N second shift registers 30 may be located before the M first shift registers 10, that is, the N second shift registers 30 may be arranged in sequence along the column direction of the pixel circuit first, and then the M first shift registers 10 may be arranged in sequence along the column direction of the pixel circuit after the N-th-level second shift register 30. This arrangement may be understood as placing the N-level second shift register 30 in front of the first shift register 10. In this way, the wiring length between the shift registers and the pixel circuits may be shortened, which helps to further achieve a narrow frame.

As shown in FIG. 4, in a display cycle of the display panel, for the same pixel circuit in the first to N-th pixel circuit groups 20, the effective pulse start time of the first control terminal receiving the third gate control signal Scan3 and the effective pulse start time of the second control terminal receiving the second gate control signal Scan2 may be different. The gate control signal S1N received by the first control terminal of these pixel circuits may be the third gate control signal Scan3, and the gate control signal S2N received by the second control terminal may be the second gate control signal Scan2. Exemplarily, the effective pulse start time of the first control terminal receiving the third gate control signal Scan3 may be earlier than the effective pulse start time of the second control terminal receiving the second gate control signal Scan2, and the effective pulse of the first control terminal receiving the third gate control signal Scan3 may not overlap with the effective pulse of the second control terminal receiving the second gate control signal Scan2.

For the same pixel circuit in the (N+1)-th to M-th pixel circuit groups 20, the effective pulse start time of the first control terminal receiving the first gate control signal Scan1 and the effective pulse start time of the second control terminal receiving the second gate control signal Scan2 may be different. The gate control signal S1N received by the first control terminal of these pixel circuits may be the first gate control signal Scan1, and the gate control signal S2N received by the second control terminal may be the second gate control signal Scan2. Exemplarily, the effective pulse start time of the first control terminal receiving the first gate control signal Scan1 may be earlier than the effective pulse start time of the second control terminal receiving the second gate control signal Scan2, and the effective pulse of the first control terminal receiving the first gate control signal Scan1 and the effective pulse of the second control terminal receiving the second gate control signal Scan2 may not overlap.

In the present embodiment, the third gate control signal Scan3 may be provided to the first control terminals of the first N pixel circuit groups 20 through the second shift registers 30 by arranging N cascaded second shift registers 30 before the M first shift registers 10, and a first gate control signal Scan1 may be provided to the first control terminals of the remaining (M−N) pixel circuit groups 20 through the first shift registers 10 by arranging N cascaded second shift registers 30 before the M first shift registers 10. A second gate control signal Scan2 may be provided to the second control terminals of the M pixel circuit groups 20 through the first shift registers 10, thereby providing two different gate control signals to the two control terminals of one pixel circuit group 20 respectively. The zone-by-zone frequency division driving requirements of the pixel circuits may be realized. It can be seen that for M pixel circuit groups 20, the display panel provided by this embodiment may include the M first driving circuits 110, the N second driving circuits 310, the M first gating circuits 120, the M second gating circuits 130 and the N third gating circuits 320. A total of (N+M) driving circuits and (N+2M) gating circuits may be provided. Compared with the display panel in the existing technologies that require 2M driving circuits and 2M gating circuits, in the present disclosure, the display panel may multiplex the first driving circuits 110 through the first gating circuits 120 and the second gating circuits 130, which may reduce M−N driving circuits. N may be understood as the number of rows of pixel circuits that are staggered to connect two gate control signals. Generally speaking, N may be much smaller than M. Therefore, the display panel of the present disclosure may effectively reduce the number of driving circuits and realize a narrow frame, so as to be applied to the zone-by-zone frequency display scene.

As shown in FIG. 5 and FIG. 6, in the first shift registers 10 of the (M−N+1)-th to M-th-levels, the output terminal of at least one first gating circuit 120 may be in a suspended state, and/or, the output terminal of at least one first gating circuit 120 may be electrically connected to the output terminal NEXT of the first driving circuit 110 of the same level. M represents the number of first shift registers 10. Optionally, in the first shift registers 10 of the (M−N+1)-th to M-th-levels, the output terminal of at least one first gating circuit 120 may be in a suspended state and may not be connected to the pixel circuit group, that is, the first gate control signal Scan1 output by the first gating circuit 120 may not be transmitted to the pixel circuit group 20.

The N cascaded second shift registers 30 and the first (M−N)-th-levels of the first shift registers 10 may meet the driving requirements for the first control terminals of the M pixel circuit groups 20, and the first gating circuits 120 in the first shift registers 10 of the (M−N+1)-th to M-th-levels may be understood as redundant circuits. For example, the output terminals of the first gating circuits 120 of the (M−N+1)-th to M-th-levels may be respectively in a suspended state, and the first gate control signal Scan1 may be directly output without being connected to the pixel circuits, which may reduce the signal routing between circuits and help further achieve a narrow frame.

For another example, the output terminals of the first gating circuits 120 of the (M−N+1)-th to M-th-levels may be respectively electrically connected to the output terminals NEXT of the first driving circuits 110 of the same level, that is, the output terminal of the first gating circuits 120 of the (M−N+1)-th to M-th-levels may be electrically connected to the output terminals NEXT of the first driving circuits 110 of the (M−N+1)-th-level, and the output terminal of the first gating circuit 120 of the (M−N+2)-th-level may be electrically connected to the output terminal NEXT of the first driving circuit 110 of the (M−N+2)-th-level, and so on until the first gating circuit 120 of the M-th-level. These first gating circuits 120 may have no signal output. In this way, signal crosstalk between circuits may be avoided, and the reliability of the display panel may be ensured.

Figure 7:
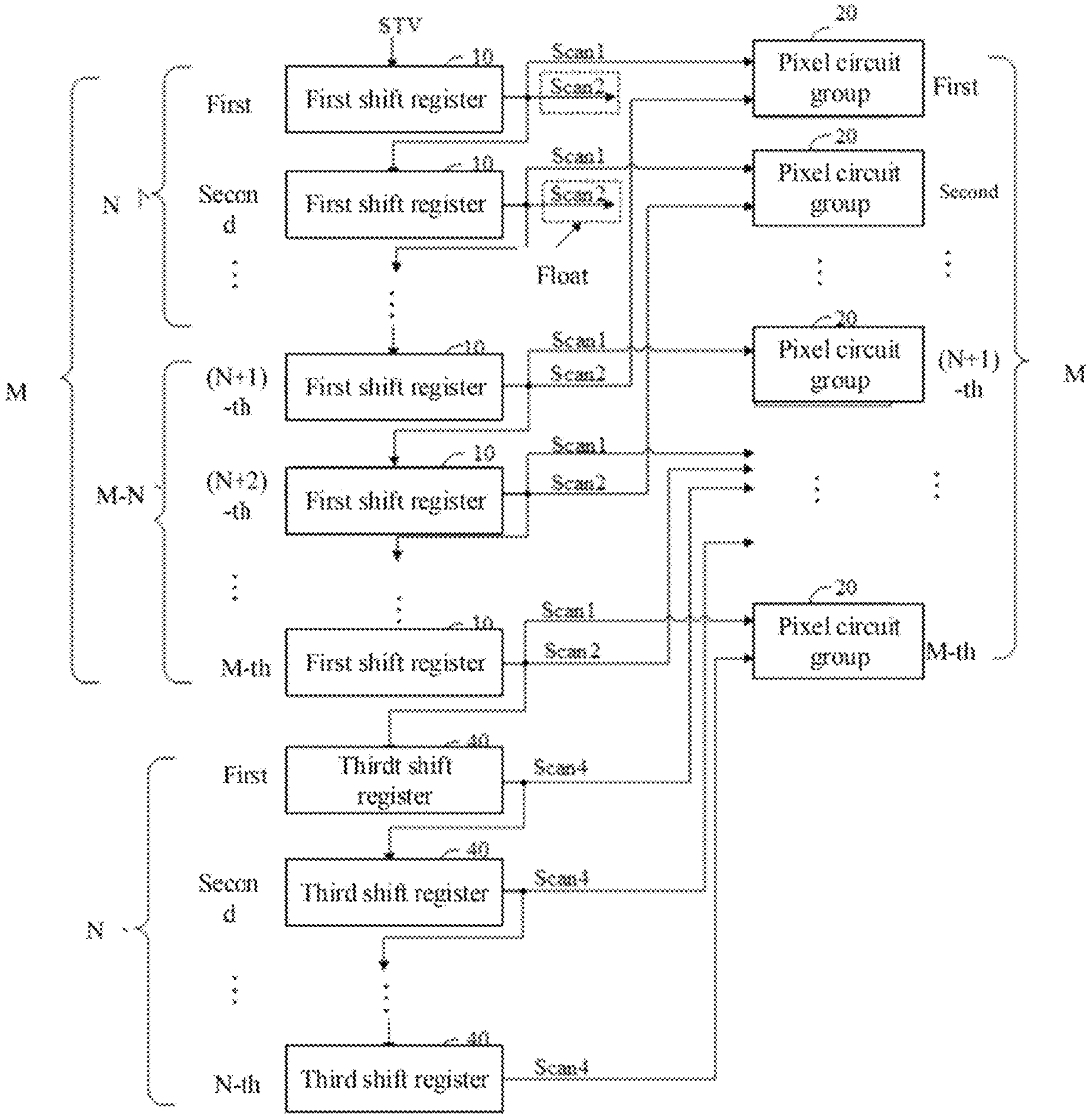
FIG. 7 illustrates another exemplary display panel consistent with various disclosed embodiments in the present disclosure.
Figure 8:
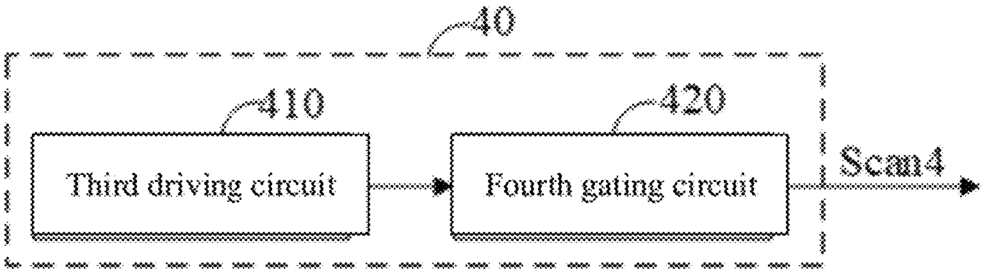
FIG. 8 illustrates an exemplary third shift register consistent with various disclosed embodiments in the present disclosure.

In one embodiment shown in FIG. 7 which is a schematic diagram of the structure of a display panel and FIG. 8 which is a schematic diagram of the structure of a third shift register 40, the display panel may further include N cascaded third shift registers 40, and each third shift register 40 may include a third drive circuit 410 and a fourth gating circuit 420. The output terminal of the p-th-level third drive circuit 410 may be electrically connected to the input terminal of the (p+1)-th-level third drive circuit 410 and the input terminal of the p-th-level fourth gating circuit 420, respectively, where $1 \le p < N$. The fourth gating circuit 420 may output a fourth gate control signal Scan4. The input terminal of the first-level first drive circuit 110 may receive the start signal STV, and the output terminal NEXT of the M-th-level first drive circuit 110 may also be electrically connected to the input terminal of the first-level third drive circuit 410, where M represents the number of the first shift registers 10 and $1 \le k = j \le M$. That is, the first control terminal of the j-th pixel circuit group 20 may be electrically connected to the output terminal of the j-th first gating circuit 120, and the second control terminal of the j-th pixel circuit group 20 may be electrically connected to the output terminal of the (j+N)-th second gating circuit 130, where $1 \le j \le M$. The second control terminal of the q-th pixel circuit group 20 may be electrically connected to the output terminal of the (q-M)-th fourth gating circuit 420, where $q > M$.

In one embodiment shown in FIG. 7, the display panel may include M cascaded first shift registers 10, N cascaded third shift registers 40, and M pixel circuit groups 20. The input terminal of the first-level first driving circuit 110 may receive the start signal STV. The output terminal NEXT of the first-level first driving circuit 110 may be electrically connected to the input terminal of the second-level first driving circuit 110, the input terminal of the first-level first gating circuit 120, and the input terminal of the first-level second gating circuit 130, respectively. The output terminal NEXT of the second-level first driving circuit 110 may be electrically connected to the input terminal of the third-level first driving circuit 110, the input terminal of the second-level first gating circuit 120, and the input terminal of the second-level second gating circuit 130, respectively, and so on until the (M−1)-th-level first driving circuit 110. The output terminal NEXT of the M-th-level first driving circuit 110 may be electrically connected to the input terminal of the first level third driving circuit 410, the input terminal of the M-th-level first gating circuit 120, and the input terminal of the M-th-level second gating circuit 130 respectively. The output terminal of the first level third driving circuit 410 may be electrically connected to the input terminal of the second level third driving circuit 410 and the input terminal of the 1st level fourth gating circuit 420 respectively. The output terminal of the second level third driving circuit 410 may be electrically connected to the input terminal of the third level third driving circuit 410 and the input terminal of the second level fourth gating circuit 420 respectively, and so on until the (N−1)-th-level third driving circuit 410. The output terminal of the N-th-level third driving circuit 410 may be electrically connected to the input terminal of the N-th-level fourth gating circuit 420.

The first control terminal of the first pixel circuit group 20 may be electrically connected to the output terminal of the first-level first gating circuit 120, the second control terminal of the first pixel circuit group 20 may be electrically connected to the output terminal of the (N+1)-th-level second gating circuit 130, the first control terminal of the second pixel circuit group 20 may be electrically connected to the output terminal of the second-level first gating circuit 120, the second control terminal of the second pixel circuit group 20 may be electrically connected to the output terminal of the (N+2)-th-level second gating circuit 130, and so on to the (M−N)-th pixel circuit group 20. The first control terminal of the (M−N+1)-th pixel circuit group 20 may be electrically connected to the output terminal of the (M−N+1)-th-level first gating circuit 120, the second control terminal of the (M−N+1)-th pixel circuit group 20 may be electrically connected to the output terminal of the first-level fourth gating circuit 420, the first control terminal of the (M−N+2)-th pixel circuit group 20 may be electrically connected to the output terminal of the (M−N+2)-th-level first gating circuit 120, the second control terminal of the (M−N+2)-th pixel circuit group 20 may be electrically connected to the output terminal of the second-level fourth gating circuit 420, and so on until the M-th pixel circuit group 20.

Exemplarily, in one embodiment, the plurality of cascaded first shift registers 10 and the plurality of cascaded third shift registers 40 may be arranged along the column direction of the pixel circuits. For example, taking the M cascaded first shift registers 10 and N cascaded third shift registers 40 shown in FIG. 7 as an example, the M first shift registers 10 and the N third shift registers 40 may be located in the same column, and the M first shift registers 10 may be located before the N third shift registers 40. That is, the M first shift registers 10 may be arranged in sequence along the column direction of the pixel circuit first, and then the N third shift registers 40 may be arranged in sequence along the column direction of the pixel circuit after the M-th first shift register 10. This arrangement may be understood as placing the N-th-level third shift register 40 after the first shift registers 10. Therefore, the wiring length between the shift registers and the pixel circuits may be shortened, which helps to further achieve a narrow frame.

As shown in FIG. 4, in one display cycle of the display panel, for one same pixel circuit in the first to (M−N)-th pixel circuit groups 20, the effective pulse start time of the first control terminal receiving the first gate control signal Scan1 and the effective pulse start time of the second control terminal receiving the second gate control signal Scan2 may be different. The gate control signal S1N received by the first control terminal of the pixel circuit may be the first gate control signal Scan1, and the gate control signal S2N received by the second control terminal may be the second gate control signal Scan2. Exemplarily, the effective pulse start time of the first control terminal receiving the first gate control signal Scan1 may be earlier than the effective pulse start time of the second control terminal receiving the second gate control signal Scan2, and the effective pulse of the first control terminal receiving the first gate control signal Scan1 and the effective pulse of the second control terminal receiving the second gate control signal Scan2 may not overlap. For one same pixel circuit in the (M−N+1)-th to M-th pixel circuit groups 20, the effective pulse start time of the first control terminal receiving the first gate control signal Scan1 and the effective pulse start time of the second control terminal receiving the fourth gate control signal Scan4 may be different, and the gate control signal S1N received by the first control terminal of these pixel circuits may be the first gate control signal Scan1, and the gate control signal S2N received by the second control terminal may be the fourth gate control signal Scan4. Exemplarily, the effective pulse start time of the first control terminal receiving the first gate control signal Scan1 may be earlier than the effective pulse start time of the second control terminal receiving the fourth gate control signal Scan4, and the effective pulse of the first control terminal receiving the first gate control signal Scan1 may not overlap with the effective pulse of the second control terminal receiving the fourth gate control signal Scan4.

In the display panel provided by the present embodiment, the play panel may provide the first gate control signal Scan1 to the first control terminals of the M pixel circuit groups 20 through the M cascaded first shift registers 10, provide the second gate control signal Scan2 to the second control terminals of the first (M−N) pixel circuit groups 20 through the first shift registers 10, and provide the fourth gate control signal Scan4 to the second control terminals of the remaining N pixel circuit groups 20 through the third shift registers 40, by arranging N cascaded third shift registers 40 after the M first shift registers 10. Therefore, two different gate control signals may be provided to the two control terminals of each pixel circuit group 20 respectively, to meet the pixel circuit's zone-by-zone frequency division driving requirements. It can be seen that, for the M pixel circuit groups 20, in the present embodiment, the display panel may include the M first driving circuits 110, the N third driving circuits 410, the M first gating circuits 120, the M second gating circuits 130 and the N fourth gating circuits 420, that is, a total of (N+M) driving circuits and (N+2M) gating circuits. Compared with the display panel in the existing technologies that requires 2M driving circuits and 2M gating circuits, the display panel provided by the present disclosure may multiplex the first driving circuits 110 by the first gating circuits 120 and the second gating circuits 130, which may reduce the number of driving circuits. It can be understood that the transistors and capacitors included in the same layer of the driving circuit may have a large number of transistors, and the capacitors may also require a certain layout space. Therefore, in the present disclosure, the width of the display panel frame may be reduced to realize a narrow frame. N may be understood as the number of rows of the pixel circuits that are staggered to connect the two gate control signals. Generally speaking, N may be much smaller than M. Therefore, the display panel provided by the present disclosure may effectively reduce the number of driving circuits and realize a narrow frame, so as to be applied to the zone-by-zone frequency division display scene.

As shown in FIG. 7 and FIG. 8, among the first shift registers 10 of the first to the N-th levels, the output terminal off at least one second gating circuit 130 may be in a suspended state, and/or, the output terminal of at least one second gating circuit 130 may be electrically connected to the output terminal NEXT of the first driving circuit 110 of the same level, where M represents the number of the first shift registers 10.

M cascaded first shift registers 10 may meet the driving requirements of the first control terminals of the M pixel circuit groups 20. The second gating circuits 130 in the first shift registers 10 of the (N+1)-th to the M-th-levels and the fourth gating circuits 420 of the N cascaded third shift registers 40 may meet the driving requirements of the second control terminals of the M pixel circuit groups 20. The second gating circuits 130 in the first shift registers 10 of the first to the N-th-levels may be understood as redundant circuits. For example, the output terminals of the second gating circuits 130 of the first to the N-th-levels may be in a suspended state, and the second gate control signal Scan2 may be directly output without being connected to the pixel circuits, which may reduce the signal routing between circuits and help further achieve a narrow frame.

For another example, the output terminals of the second gating circuits 130 of the first to the N-th-levels may be respectively electrically connected to the output terminal NEXT of the first driving circuit 110 of the same level, that is, the output terminal of the second gating circuit 130 of the first level may be electrically connected to the output terminal NEXT of the first driving circuit 110 of the first level, and the output terminal of the second gating circuit 130 of the second level may be electrically connected to the output terminal NEXT of the first driving circuit 110 of the second level, and so on until the second gating circuit 130 of the N-th-level. These second gating circuits 130 may have no signal output. Therefore, signal crosstalk between circuits may be avoided, and the reliability of the display panel may be ensured.

Figure 9:
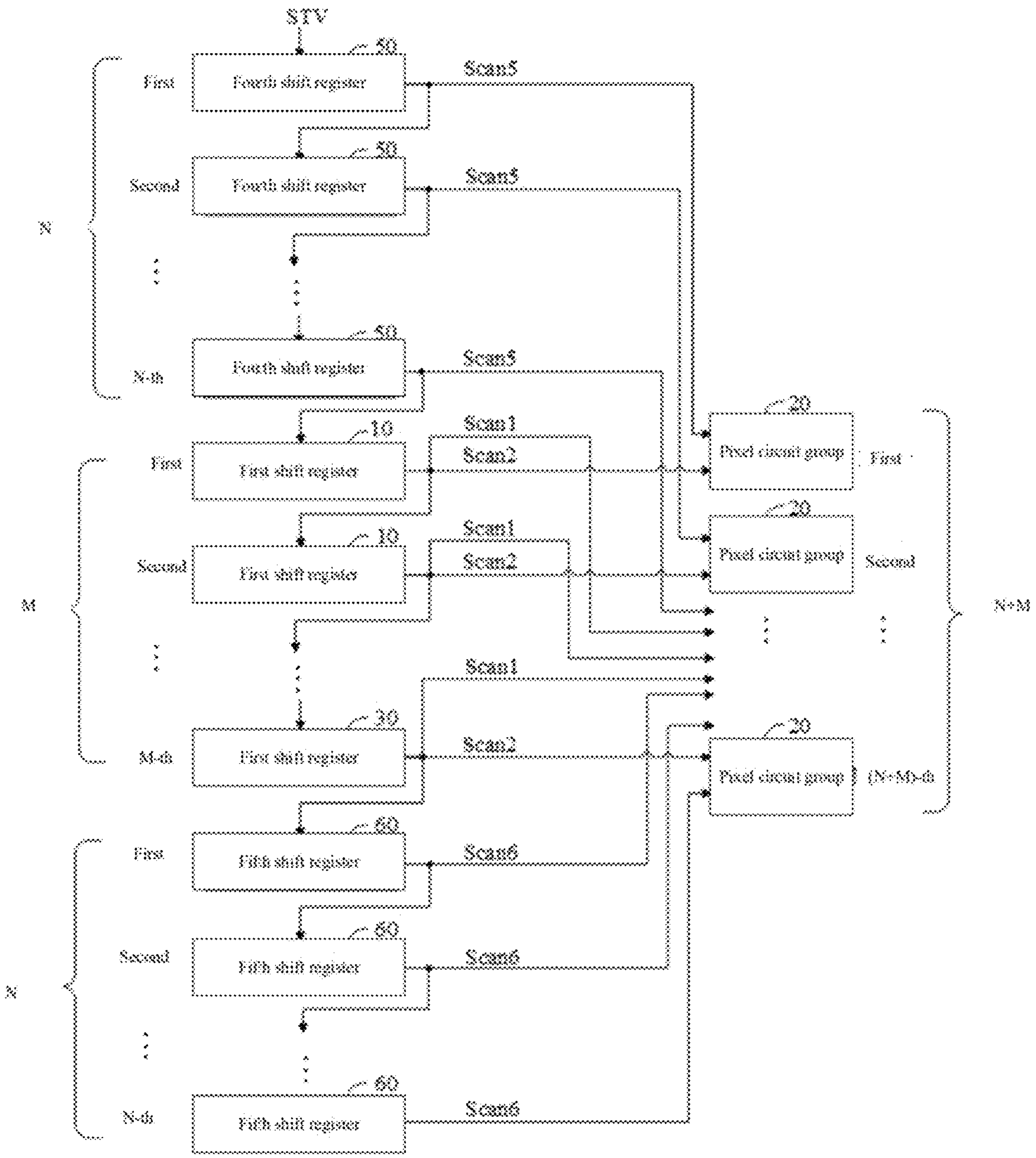
FIG. 9 illustrates another exemplary display panel consistent with various disclosed embodiments in the present disclosure.
Figure 10:
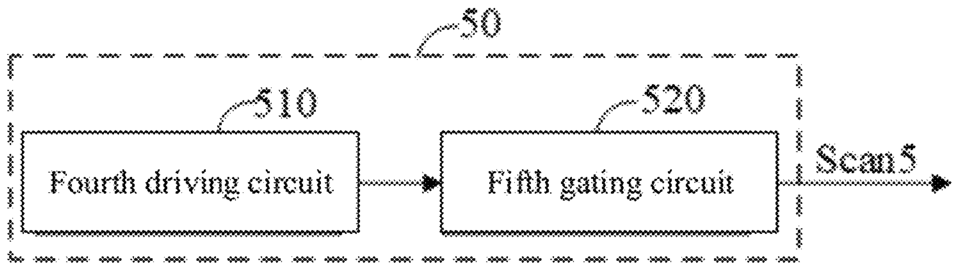
FIG. 10 illustrates an exemplary fourth shift register consistent with various disclosed embodiments in the present disclosure.
Figure 11:
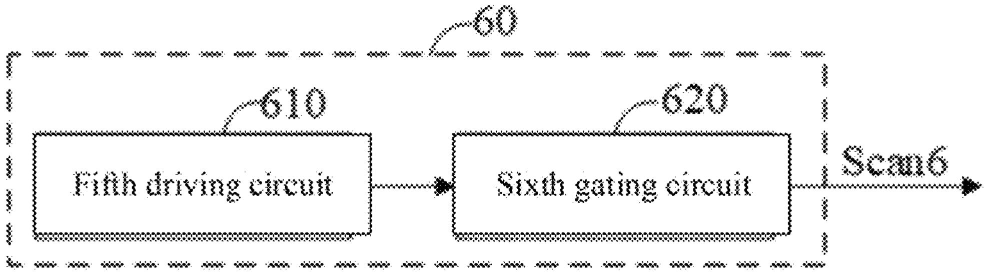
FIG. 11 illustrates an exemplary fifth shift register consistent with various disclosed embodiments in the present disclosure.

In one embodiment shown in FIG. 9 which is a schematic diagram of the structure of a display panel, FIG. 10 which is a schematic diagram of the structure of a fourth shift register 50, and FIG. 11 which is a schematic diagram of the structure of a fifth shift register 60, the display panel may further include N cascaded fourth shift registers 50 and N cascaded fifth shift registers 60. Each fourth shift register 50 may include a fourth drive circuit 510 and a fifth gating circuit 520. The output terminal of the p-th-level fourth drive circuit 510 may be electrically connected to the input terminal of the p+1-th-level fourth drive circuit 510 and the input terminal of the p-th-level fifth gating circuit 520, respectively. The output terminal of the N-th-level fourth drive circuit 510 may be also electrically connected to the input terminal of the first-level first drive circuit 110, where 1≤p<N. The input terminal of the first-level fourth drive circuit 510 may receive the start signal STV. The fifth gating circuit 520 may output the fifth gate control signal Scan5.

Each fifth shift register 60 may include a fifth drive circuit 610 and a sixth gating circuit 620. The output terminal of the r-th fifth driving circuit 610 may be electrically connected to the input terminal of the (r+1)-th fifth driving circuit 610 and the input terminal of the r-th sixth gating circuit 620, respectively, where 1≤r≤N. The output terminal NEXT of the M-th first driving circuit 110 may be also electrically connected to the input terminal of the first-level fifth driving circuit 610, and the M-th first driving circuit 110 may be the last level in the first shift registers 10. The sixth gating circuit 620 may output the sixth gate control signal Scan6.

The first control terminal of the q-th pixel circuit group 20 may be electrically connected to the output terminal of the q-th fifth gating circuit 520, where 1≤q≤N and 0<k=j−N≤M. That is, the second control terminal of the s-th pixel circuit group 20 may be electrically connected to the output terminal of the (s-M)-th sixth gating circuit 620, where M+N<s≤M+2N.

In one embodiment shown in FIG. 9, the display panel may include the M cascaded first shift registers 10, the N cascaded fourth shift registers 50, the N cascaded fifth shift registers 60 and (M+N) pixel circuit groups 20. The input terminal of the first-level fourth driving circuit 510 may receive the start signal STV; the output terminal of the first-level fourth driving circuit 510 may be electrically connected to the input terminal of the second-level fourth driving circuit 510 and the input terminal of the first-level fifth gating circuit 520, respectively. The output terminal of the second-level fourth driving circuit 510 may be electrically connected to the input terminal of the third-level fourth driving circuit 510 and the input terminal of the second-level fifth gating circuit 520, respectively, and so on until the (N−1)-th-level fourth driving circuit 510. The output terminal of the N-th-level fourth driving circuit 510 may be electrically connected to the input terminal of the first level first driving circuit 110 and the input terminal of the N-th-level fifth gating circuit 520 respectively. The output terminal NEXT of the first level first driving circuit 110 may be electrically connected to the input terminal of the second level first driving circuit 110, the input terminal of the first level first gating circuit 120, and the input terminal of the first level second gating circuit 130 respectively. The output terminal NEXT of the second level first driving circuit 110 may be electrically connected to the input terminal of the third level first driving circuit 110, the input terminal of the second level first gating circuit 120, and the input terminal of the second level second gating circuit 130 respectively, and so on until the (M−1)-th-level third driving circuit 410. The output terminal NEXT of the M-th-level first driving circuit 110 may be electrically connected to the input terminal of the first-level fifth driving circuit 610, the input terminal of the M-th-level first gating circuit 120, and the input terminal of the M-th-level second gating circuit 130 respectively. The output terminal of the first-level fifth driving circuit 610 may be electrically connected to the input terminal of the second-level fifth driving circuit 610 and the input terminal of the first-level sixth gating circuit 620 respectively. The output terminal of the second-level fifth driving circuit 610 may be electrically connected to the input terminal of the third-level fifth driving circuit 610 and the input terminal of the second-level sixth gating circuit 620 respectively, and so on until the (N−1)-th-level fifth driving circuit 610. The output terminal of the N-th-level fifth driving circuit 610 may be electrically connected to the input terminal of the N-th-level sixth gating circuit 620.

The first control terminal of the first pixel circuit group 20 may be electrically connected to the output terminal of the first-level fifth gating circuit 520, the second control terminal of the first pixel circuit group 20 may be electrically connected to the output terminal of the first-level second gating circuit 130, the first control terminal of the second pixel circuit group 20 may be electrically connected to the output terminal of the second-level fifth gating circuit 520, the second control terminal of the second pixel circuit group 20 may be electrically connected to the output terminal of the second-level second gating circuit 130, and so on to the N-th pixel circuit group 20. The first control terminal of the (N+1)-th pixel circuit group 20 may be electrically connected to the output terminal of the first-level first gating circuit 120, the second control terminal of the (N+1)-th pixel circuit group 20 may be electrically connected to the output terminal of the (N+1)-th second gating circuit 130, the first control terminal of the (N+2)-th pixel circuit group 20 may be electrically connected to the output terminal of the second-level first gating circuit 120, the second control terminal of the (N+2)-th pixel circuit group 20 may be electrically connected to the output terminal of the (N+2)-th-level second gating circuit 130, and so on and so forth until the M-th pixel circuit group 20. The first control terminal of the (M+1)-th pixel circuit group 20 may be electrically connected to the output terminal of the (M−N+1)-th-level first gating circuit 120, the second control terminal of the (M+1)-th pixel circuit group 20 may be electrically connected to the output terminal of the first-level sixth gating circuit 620, the first control terminal of the (M+2)-th pixel circuit group 20 may be electrically connected to the output terminal of the (M−N+2)-th-level first gating circuit 120, the second control terminal of the (M+2)-th pixel circuit group 20 may be electrically connected to the output terminal of the second-level sixth gating circuit 620, and so on and so forth until the (M+N)-th pixel circuit group 20.

Exemplarily, a plurality of cascaded fourth shift registers 50, a plurality of cascaded first shift registers 10, and a plurality of cascaded fifth shift registers 60 may be arranged along the column direction of the pixel circuit. For example, taking the display panel with the N cascaded fourth shift registers 50, the M cascaded first shift registers 10, and the N cascaded fifth shift registers 60 shown in FIG. 7 as an example, the N cascaded fourth shift registers 50, the M cascaded first shift registers 10, and the N cascaded fifth shift registers 60 may be located in the same column, and may be arranged in sequence along the column direction of the pixel circuit. This arrangement may be understood as placing the N-level fourth shift register 50 in front of the first shift register 10, and placing the N-level fifth shift register 60 behind it. In this way, the wiring length between the shift register and the pixel circuit may be shortened, which helps to further achieve a narrow frame.

As shown in FIG. 4, in one display cycle of the display panel, for one same pixel circuit in the first to N-th pixel circuit groups 20, the effective pulse start time of the first control terminal receiving the fifth gate control signal Scan5 and the effective pulse start time of the second control terminal receiving the second gate control signal Scan2 may be different. The gate control signal S1N received by the first control terminal of these pixel circuits may be the fifth gate control signal Scan5, and the gate control signal S2N received by the second control terminal may be the second gate control signal Scan2. Exemplarily, the effective pulse start time of the first control terminal receiving the fifth gate control signal Scan5 may be earlier than the effective pulse start time of the second control terminal receiving the second gate control signal Scan2, and the effective pulse of the first control terminal receiving the fifth gate control signal Scan5 may not overlap with the effective pulse of the second control terminal receiving the second gate control signal Scan2.

For one same pixel circuit in the (N+1)-th to M-th pixel circuit groups 20, the effective pulse start time of the first control terminal receiving the first gate control signal Scan1 and the effective pulse start time of the second control terminal receiving the second gate control signal Scan2 may be different. The gate control signal S1N received by the first control terminal of these pixel circuits may be the first gate control signal Scan1, and the gate control signal S2N received by the second control terminal may be the second gate control signal Scan2. Exemplarily, the effective pulse start time of the first control terminal receiving the first gate control signal Scan1 may be earlier than the effective pulse start time of the second control terminal receiving the second gate control signal Scan2, and the effective pulse of the first control terminal receiving the first gate control signal Scan1 may not overlap with the effective pulse of the second control terminal receiving the second gate control signal Scan2.

For one same pixel circuit in the (M+1)-th to (N+M)-th pixel circuit groups 20, the effective pulse start time of the first control terminal receiving the first gate control signal Scan1 and the effective pulse start time of the second control terminal receiving the sixth gate control signal Scan6 may be different. The gate control signal S1N received by the first control terminal of these pixel circuits may be the first gate control signal Scan1, and the gate control signal S2N received by the second control terminal may be the sixth gate control signal Scan6. Exemplarily, the effective pulse start time of the first control terminal receiving the first gate control signal Scan1 may be earlier than the effective pulse start time of the second control terminal receiving the sixth gate control signal Scan6, and the effective pulse of the first control terminal receiving the first gate control signal Scan1 may not overlap with the effective pulse of the second control terminal receiving the sixth gate control signal Scan6.

In the display panel provided by the present embodiment, by providing the N cascaded fourth shift registers 50 and M cascaded first shift registers 10, the first gate control signal Scan1 may be provided to the first control terminals of the (N+M) pixel circuit groups 20 through the fourth shift registers 50 and the first shift registers 10. And, by providing the M cascaded first shift registers 10 and N cascaded fifth shift registers 60, the second gate control signal Scan2 may be provided to the second control terminals of the (N+M) pixel circuit groups 20 through the first shift registers 10 and the fifth shift registers 60. Therefore, two different gate control signals may be provided to the two control terminals of the pixel circuit group 20 respectively, to meet the pixel circuit's zone-by-zone frequency division driving requirements. For the (N+M) pixel circuit groups 20, the display panel provided by the present embodiment may include the M first drive circuits 110, N fourth drive circuits 510, N fifth drive circuits 610, M first gating circuits 120, M second gating circuits 130, N fifth gating circuits 520 and N sixth gating circuits 620, that is, a total of 2N+M drive circuits and 2N+2M gating circuits. Compared with the display panel in the existing technologies that requires 2N+2M drive circuits and 2N+2M gating circuits, the display panel in the present disclosure may multiplex the first drive circuits 110 by the first gating circuits 120 and the second gating circuits 130, which may reduce M drive circuits, effectively reduce the number of drive circuits, and realize narrow borders for application in zone-by-zone frequency division display scenarios.

It can be understood that the display panel provided by the above embodiments may not have redundant first shift registers 10, fifth shift registers 60 and sixth shift registers, and may fully utilize each circuit structure without setting redundant structures, which helps to further realize narrow borders. In the application, each of the fifth shift register 60 and the sixth shift register may have one less gating circuit compared to the first shift register 10. Therefore, the fifth shift registers 60 and the sixth shift registers may be respectively set in the R corner area of the display panel, thereby further realizing a narrow frame.

Figure 12:
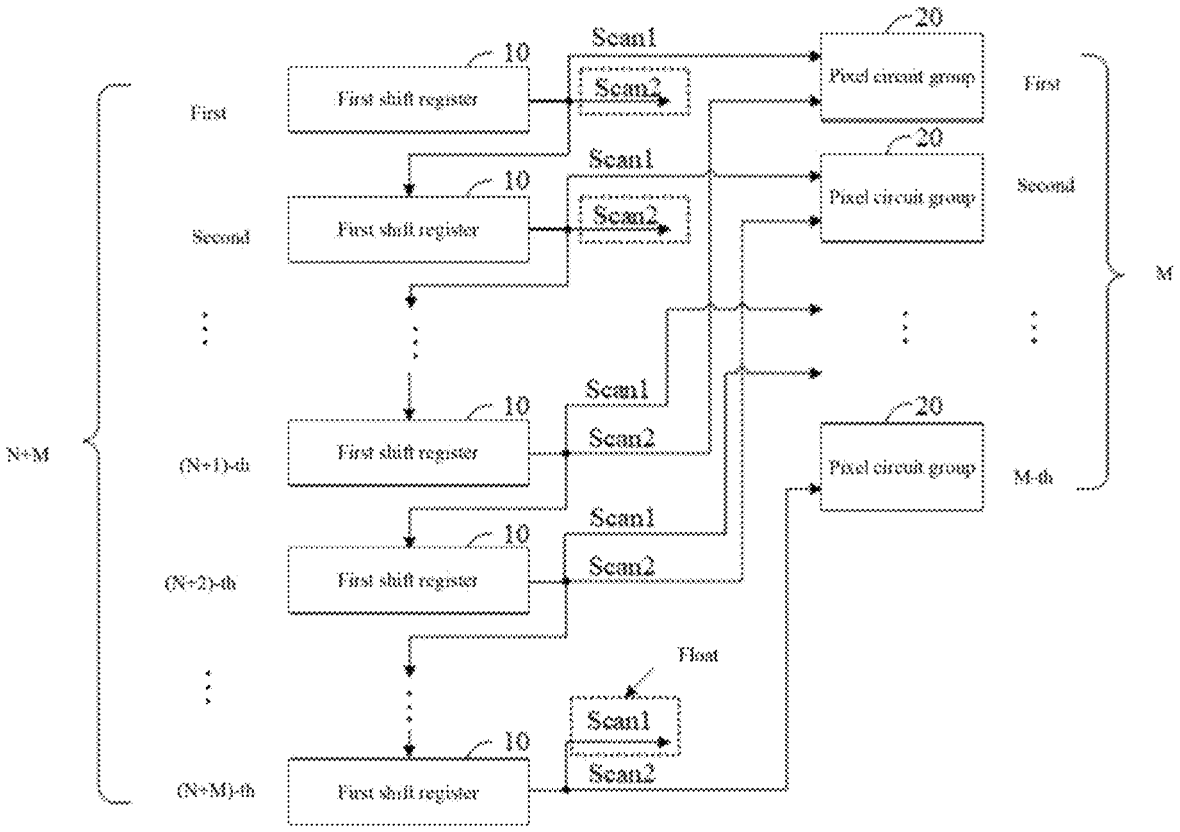
FIG. 12 illustrates another exemplary display panel consistent with various disclosed embodiments in the present disclosure.

In one embodiment shown in FIG. 12 which is a schematic diagram of the structure of a display panel, k−j≥1, that is, the first control terminal of the j-th pixel circuit group 20 may be electrically connected to the output terminal of the j-th first gating circuit 120, the second control terminal of the j-th pixel circuit group 20 may be electrically connected to the output terminal of the (j+N)-th second gating circuit 130, where j, N≥1. Exemplarily, the plurality of cascaded first shift registers 10 may be arranged along the column direction of the pixel circuit.

In the embodiment shown in FIG. 12, the display panel may include (M+N) cascaded first shift registers 10 and M pixel circuit groups 20. The input terminal of the first-level first driving circuit 110 may receive the start signal STV; the output terminal NEXT of the first-level first driving circuit 110 may be electrically connected to the input terminal of the second-level first driving circuit 110, the input terminal of the first-level first gating circuit 120, and the input terminal of the first-level second gating circuit 130, respectively. The output terminal NEXT of the second-level first driving circuit 110 may be electrically connected to the input terminal of the third-level first driving circuit 110, the input terminal of the second-level first gating circuit 120, and the input terminal of the second-level second gating circuit 130, respectively, and so on until the (M−1)-th-level first driving circuit 110. The output terminal of the M-th-level second driving circuit 310 may be electrically connected to the input terminal of the M-th-level first gating circuit 120 and the input terminal of the (M+N)-th-level second gating circuit 130, respectively. The first control terminal of the first pixel circuit group 20 may be electrically connected to the output terminal of the first-level first gating circuit 120, the second control terminal of the first pixel circuit group 20 may be electrically connected to the output terminal of the (N+1)-th-level second gating circuit 130, the first control terminal of the second pixel circuit group 20 may be electrically connected to the output terminal of the second-level first gating circuit 120, the second control terminal of the second pixel circuit group 20 may be electrically connected to the output terminal of the (N+2)-th-level second gating circuit 130, and so on to the M-th pixel circuit group 20.

As shown in FIG. 4, in one display cycle of the display panel, for one same pixel circuit in the first to M-th pixel circuit groups 20, the effective pulse start time of the first control terminal receiving the first gate control signal Scan1 and the effective pulse start time of the second control terminal receiving the second gate control signal Scan2 may be different. The gate control signal S1N received by the first control terminal of these pixel circuits may be the first gate control signal Scan1, and the gate control signal S2N received by the second control terminal may be the second gate control signal Scan2. Exemplarily, the effective pulse start time of the first control terminal receiving the fifth gate control signal Scan5 may be earlier than the effective pulse start time of the second control terminal receiving the second gate control signal Scan2, and the effective pulse of the first control terminal receiving the fifth gate control signal Scan5 may not overlap with the effective pulse of the second control terminal receiving the second gate control signal Scan2.

In the display panel provided by the present embodiment, the first gate control signal Scan1 may be provided to the first control terminals of the M pixel circuit groups 20 through the first M first shift registers 10. And, the second gate control signal Scan2 may be provided to the second control terminals of the M pixel circuit groups 20 through the last M first shift registers 10. Therefore, two different gate control signals may be provided to the two control terminals of the pixel circuit group 20 respectively, to meet the pixel circuit's zone-by-zone frequency division driving requirements. For the M pixel circuit groups 20, the display panel provided by the present embodiment may include the M+N first drive circuits 110, M+N first gating circuits 120, and M+N second gating circuits 130, that is, a total of M+N drive circuits and 2M+2N gating circuits. Compared with the display panel in the existing technologies that requires 2N+2M drive circuits and 2N+2M gating circuits, the display panel in the present disclosure may multiplex the first drive circuits 110 by the first gating circuits 120 and the second gating circuits 130, which may reduce M−N drive circuits, effectively reduce the number of drive circuits, and realize narrow borders for application in zone-by-zone frequency division display scenarios.

Figure 13:
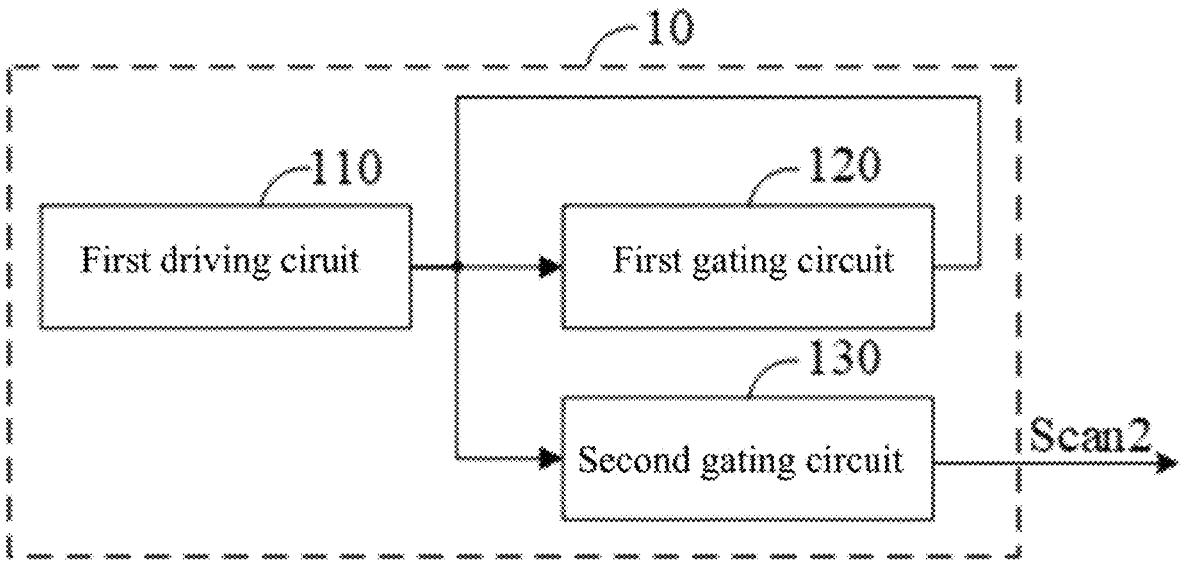
FIG. 13 illustrates an exemplary first shift register consistent with various disclosed embodiments in the present disclosure.

In one embodiment shown in FIG. 13 which is a schematic diagram of a first shift register 10 and FIG. 5, among the first shift registers 10 of the first to the N-th-levels, the output terminal off at least one second gating circuit 130 may be in a suspended state, and/or, the output terminal of at least one second gating circuit 130 may be electrically connected to the output terminal NEXT of the first driving circuit 110 of the same level, where M+N represents the number of the first shift registers 10.

The first M cascaded first shift registers 10 may meet the driving requirements of the first control terminals of the M pixel circuit groups 20. The last M cascaded first shift registers 10 may meet the driving requirements of the second control terminals of the M pixel circuit groups 20. The second gating circuits 130 in the first shift registers 10 of the first level to the N-th-levels, and the first gating circuits 120 of the first shift registers 10 of the (M−N+1)-th-level to the M-th-level may be understood as redundant circuits. For example, the output terminals of the second gating circuits 130 of the first to the N-th-levels may be in a suspended state, and the output terminals of the first gating circuits 120 of the (M−N+1)-th-level to the M-th-level may be in a suspended state. These gating circuits may not need to be connected to the pixel circuits, which may reduce the signal routing between circuits and help further achieve a narrow frame.

For another example, the output terminals of the second gating circuits 130 of the first to the N-th-levels, and the output terminals of the first gating circuits 120 of the (M−N+1)-th-level to the M-th-level, may be respectively electrically connected to the output terminal NEXT of the first driving circuit 110 of the same level. That is, the output terminal of the second gating circuit 130 of the first level may be electrically connected to the output terminal NEXT of the first driving circuit 110 of the first level, and the output terminal of the second gating circuit 130 of the second level may be electrically connected to the output terminal NEXT of the first driving circuit 110 of the second level, and so on until the second gating circuit 130 of the N-th-level. The output terminal of the first gating circuit 120 of the (M−N+1)-th-level may be electrically connected to the output terminal NEXT of the first driving circuit 110 of the (M−N+1)-th-level, the output terminal of the first gating circuit 120 of the (M−N+2)-th-level may be electrically connected to the output terminal NEXT of the first driving circuit 110 of the (M−N+2)-th-level, and so on until the first gating circuit 120 of the M-th-level. These second gating circuits 130 and first gating circuits 120 may have no signal output. Therefore, signal crosstalk between circuits may be avoided, and the reliability of the display panel may be ensured.

As shown in FIG. 4, in one embodiment, in one display cycle of the display panel, for one same pixel circuit, the effective pulse start time difference between the gate control signal S1N received by the first control terminal and the gate control signal S2N received by the second control terminal may be a*H*N, where a is the number of pixel circuit rows included in each pixel circuit group 20, H is the time for the display panel to refresh a row of pixel circuits, and a and N≥1. For example, in one embodiment, a and H may be respectively equal to 2, that is, one pixel circuit group 20 may include two rows of pixel circuits, and the two control terminals of one pixel circuit may be connected to the shift registers with an offset of two rows. Then, the effective pulse start time difference between the gate control signal S1N received by the first control terminal and the gate control signal S2N received by the second control terminal of the pixel circuit in the display panel may be 4H. In the display panel provided in the present disclosure, the effective pulse start time difference between the gate control signals received by the two control terminals may be effectively controlled by designing the connection relationship between the two control terminals of the pixel circuit and the shift register to meet the driving requirements of the pixel circuit.

For example, in one embodiment shown in FIG. 5, for one same pixel circuit in the first to N-th pixel circuit groups 20, the effective pulse start time difference between the first control terminal receiving the third gate control signal Scan3 and the second control terminal receiving the second gate control signal Scan2 may be a*H*N. For one same pixel circuit in the (N+1)-th to M-th pixel circuit groups 20, the effective pulse start time difference between the first control terminal receiving the first gate control signal Scan1 and the second control terminal receiving the second gate control signal Scan2 may be a*H*N. Similarly, for the display panels shown in FIG. 7, FIG. 9 and FIG. 12, the difference is that the gate control signals received by the first control terminal and the second control terminal are different, but for the same pixel circuit, the pulse start time difference between the gate control signal received by the first control terminal and the gate control signal received by the second control terminal may be a*H*N, which will not be repeated here.

Figure 14:
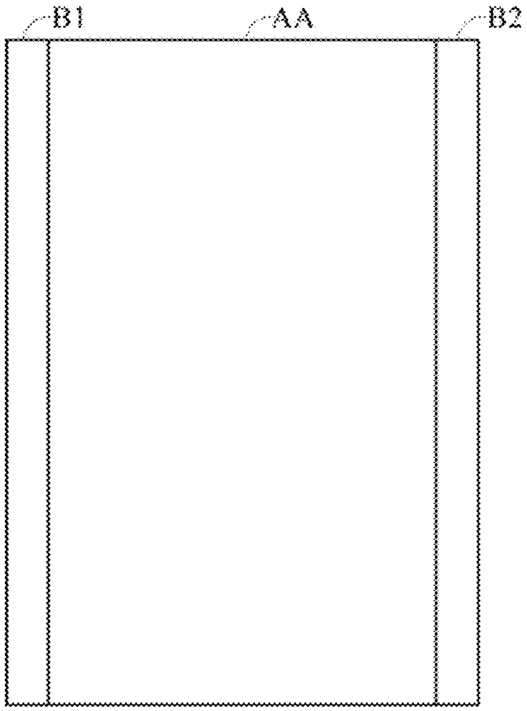
FIG. 14 illustrates another exemplary display panel consistent with various disclosed embodiments in the present disclosure.

In one embodiment shown in FIG. 14 which is a schematic diagram of the structure of a display panel, the display panel may include a display area AA and a non-display area. The non-display area may include a first non-display area B1 and a second non-display area B2. The first non-display area B1, the display area AA and the second non-display area B2 may be arranged along a first direction. The first drive circuits 110 and the first gating circuits 120 may be respectively located in the first non-display area B1, and the second gating circuits 130 may be located in the second non-display area B2. The display panel may further include a gating signal routing, and the gating signal routing may be located in the display area AA. The second gating circuits 130 may be electrically connected to the first drive circuits 110 through the gating signal routing. Therefore, the first drive circuits 110 and the first gating circuits 120 may be arranged in the first non-display area B1, and the second gating circuits 130 may be arranged in the second non-display area B2, to avoid the circuits being concentrated in the same area and may help to achieve a narrow frame.

It should be noted that the first driving circuits 110, the first gating circuits 120 and the second gating circuits 130 may also be respectively arranged in the first non-display area B1, or the first driving circuit 110, the first gating circuit 120 and the second gating circuit 130 may also be respectively arranged in the second non-display area B2. The appropriate layout method may be selected according to the existing technologies, which is not limited here.

Figure 15:
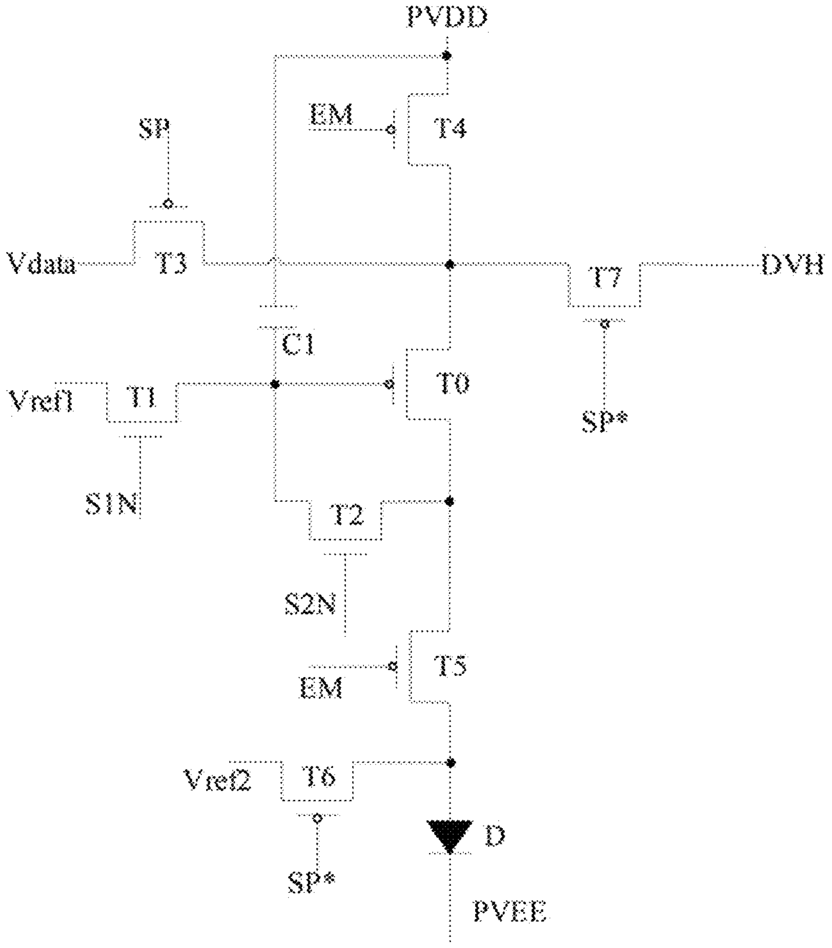
FIG. 15 illustrates an exemplary pixel circuit consistent with various disclosed embodiments in the present disclosure.

In one embodiment shown in FIG. 15 which is a schematic diagram of the structure of a pixel circuit, the pixel circuit may include a driving transistor TO, a first initialization transistor T1 and a threshold compensation transistor T2. The first electrode of the first initialization transistor T1 may be electrically connected to the first initialization signal terminal Vref1, the second electrode of the first initialization transistor T1 may be electrically connected to the gate of the driving transistor TO and the first electrode of the threshold compensation transistor T2, the gate of the first initialization transistor T1 may be the first control terminal of the pixel circuit, the second electrode of the threshold compensation transistor T2 may be electrically connected to the first electrode of the driving transistor TO, and the gate of the threshold compensation transistor T2 may be the second control terminal of the pixel circuit. Based on this, the display panel provided by the present embodiment may provide two gate control signals with different timings for the first initialization transistor T1 and the threshold compensation transistor T2 in the pixel circuit, respectively, to independently control the on-off state of the first initialization transistor T1 and the threshold compensation transistor T2 through the two gate control signals, thereby realizing full-screen same-frequency refresh and/or zone-by-zone frequency division refresh to meet the display requirements of multiple scenes.

Taking the display panel shown in FIG. 5 as an example, for the M pixel circuit groups 20, the gates of the first initialization transistors T1 in the first pixel circuit group 20 may be respectively electrically connected to the output terminal of the first-level third gating circuit 320, the gates of the threshold compensation transistors T2 in the first pixel circuit group 20 may be respectively electrically connected to the output terminal of the first-level second gating circuit 130, the gates of the first initialization transistors T1 in the second pixel circuit group 20 may be respectively electrically connected to the output terminal of the second-level third gating circuit 320, the gates of the threshold compensation transistors T2 in the second pixel circuit group 20 may be respectively electrically connected to the output terminal of the second-level second gating circuit 130, and so on to the N-th pixel circuit group 20. The gates of the first initialization transistors T1 in the (N+1)-th pixel circuit group 20 may be respectively electrically connected to the output terminal of the first level first gating circuit 120, the gates of the threshold compensation transistors T2 in the (N+1)-th pixel circuit group 20 may be respectively electrically connected to the output terminal of the (N+1)-th second gating circuit 130, the gates of the first initialization transistors T1 in the (N+2)-th pixel circuit group 20 may be respectively electrically connected to the output terminal of the second level first gating circuit 120, the gates of the threshold compensation transistors T2 in the (N+2)-th pixel circuit group 20 may be respectively electrically connected to the output terminal of the (N+2)-th second gating circuit 130, and so on until the M-th pixel circuit group 20. The display panels shown in FIG. 7 to FIG. 9 and FIG. 12 may be similar to the display panel shown in FIG. 5 above, and may be not described in detail here.

As shown FIG. 15, in one embodiment, the first initialization transistor T1 and the threshold compensation transistor T2 may be N-type transistors. Exemplarily, the first initialization transistor T1 may include an N-type oxide transistor or an N-type polysilicon transistor. Exemplarily, the threshold compensation transistor T2 may include an N-type oxide transistor or an N-type polysilicon transistor.

The effective pulse of the gate control signals received by the first initialization transistor T1 and the threshold compensation transistor T2 may be a first level, and the ineffective pulse of the gate control signals received by the first initialization transistor T1 and the threshold compensation transistor T2 may be a second level, where the first level may be less than the second level. The first level may be a low level and the second level may be a high level. The first initialization module may be turned on during the time period when the effective pulse is received, and the threshold compensation module may be turned on during the time period when the effective pulse is received. It can be understood that the first initialization transistor T1 and the threshold compensation transistor T2 may be N-type transistors. Therefore, the first initialization transistor T1 and the threshold compensation transistor T2 may be turned on in response to a low level, and the first initialization transistor T1 and the threshold compensation transistor T2 may be turned off in response to a high level.

Based on the above, the effective pulse of the gate control signal output by the gating circuits of various shift registers (including the first gating circuit 120 to the sixth gating circuit 620) may be a low level, and the ineffective pulse of the gate control signal output by the gating circuits of various shift registers may be a high level. In the application, the waveform of the gate control signal output by each gating circuit may be controlled such that the first initialization transistors T1 and the threshold compensation transistors T2 are turned on in response to the low level of the corresponding gate control signal, or the first initialization transistor T1 and the threshold compensation transistor T2 are turned off in response to the high level of the corresponding gate control signal, thereby realizing effective control of the on-off state of the first initialization transistor T1 and the threshold compensation transistor T2, so as to realize the same-frequency refresh of the whole screen and/or the zone-by-zone frequency refresh and meet the display requirements of multiple scenes.

As shown in FIG. 1, in one embodiment, the first gating circuit 120 may receive the driving signal SNEXT and the first frequency control signal Ctrl1 output by the first driving circuit 110 at the same level, and the effective pulses of the driving signal SNEXT output by the first driving circuit 110 may overlap with the effective pulses of the first frequency control signal Ctrl1. In the time period when the driving signal SNEXT output by the first driving circuit 110 overlaps with the effective pulse of the first frequency control signal Ctrl1, the first gating circuit 120 may output the effective pulse of the first gate driving circuit. The first frequency control signal Ctrl1 may be related to the refresh frequency of the display panel. In the application, the waveform of the first gate control signal Scan1 may be controlled by the first frequency control signal Ctrl1, thereby realizing the control of the refresh rate of the pixel circuit electrically connected to the first gating circuit 120 to realize the zone-by-zone frequency division display.

The second gating circuit 130 may receive the driving signal SNEXT output by the output terminal SNEXT of the first driving circuit 110 at the same level and the second frequency control signal Ctrl2, and the driving signal SNEXT output by the output terminal SNEXT of the first driving circuit 110 may overlap with the effective pulses of the second frequency control signal Ctrl2. The effective pulses of the first frequency control signal Ctrl1 and the second frequency control signal Ctrl2 may not overlap. In the time period when the effective pulses of the drive signal SNEXT output by the first drive circuit 110 overlap with the effective pulses of the second frequency control signal Ctrl2, the second gating circuit 130 may output the effective pulses of the second gate drive circuit. The second frequency control signal Ctrl2 may be related to the refresh frequency of the display panel. The waveform of the second gate control signal Scan2 may be controlled by the second frequency control signal Ctrl2, thereby realizing the control of the refresh rate of the pixel circuit electrically connected to the second gating circuit 130, to realize the zone-by-zone frequency division display of the display panel.

It can be understood that for one first shift register 10 of the same level, the effective pulses of the first frequency control signal Ctrl1 and the second frequency control signal Ctrl2 may not overlap, that is, the output time of the effective pulses of the first gate control signal Scan1 output by the first gating circuit 120 and the second gate control signal Scan2 output by the second gating circuit 130 may be different, thereby satisfying the zone-by-zone frequency display of the display panel.

Figure 16:
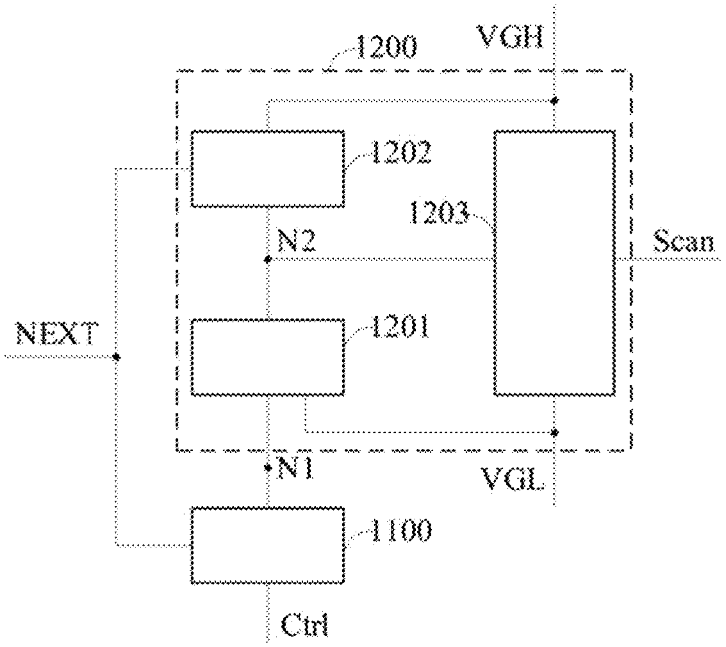
FIG. 16 illustrates an exemplary target gating circuit consistent with various disclosed embodiments in the present disclosure.

FIG. 16 is a schematic diagram of the structure of a target gating circuit. As shown in FIG. 16, in one embodiment, the target gating circuit may include at least one of a first gating circuit 120 and a second gating circuit 130. The target gating circuit may include a first gating module 1100 and a second gating module 1200. The first gating module 1100 may be electrically connected to the output terminal NEXT of the first driving circuit 110 at the same level. The first gating module 1100 may receive the driving signal SNEXT and the target frequency control signal Ctrl outputted by the output terminal SNEXT of the first driving circuit 110 respectively. The first gating module 1100 may be used to control the first node signal of the first node N1. The target frequency control signal Ctrl may include at least one of the first frequency control signal Ctrl1 or the second frequency control signal Ctrl2. The second gating module 1200 may receive the driving signal SNEXT, the first node signal, the first power supply signal VGL and the second power supply signal VGH respectively. The second gating module 1200 may output the target gate control signal. The target gate control signal may include at least one of the first gate control signal Scan1 or the second gate control signal Scan2. The first power signal VGL may be different from the second power signal VGH.

Taking the target gating circuit including the first gating circuit 120 as an example, the first gating circuit 120 may include a first gating module 1100 and a second gating module 1200. The first gating module 1100 may be electrically connected to the output terminal NEXT of the first driving circuit 110 of the same level. The first gating module 1100 may receive the driving signal SNEXT and the first frequency control signal Ctrl1 output by the first driving circuit 110 respectively. The first gating module 1100 may be used to control the first node signal of the first node N1. The second gating module 1200 may receive the driving signal SNEXT, the first node signal, the first power signal VGL and the second power signal VGH respectively, and the second gating module 1200 may output the first gate control signal Scan1. In the case where the target gating circuit includes the second gating circuit 130, the implementation may be similar to the aforementioned target gating circuit including the first gating circuit 120, except that the target frequency control signal Ctrl includes the second frequency control signal Ctrl2 and the target gate control signal includes the second gate control signal Scan2, which will not be repeated here.

Figure 17:
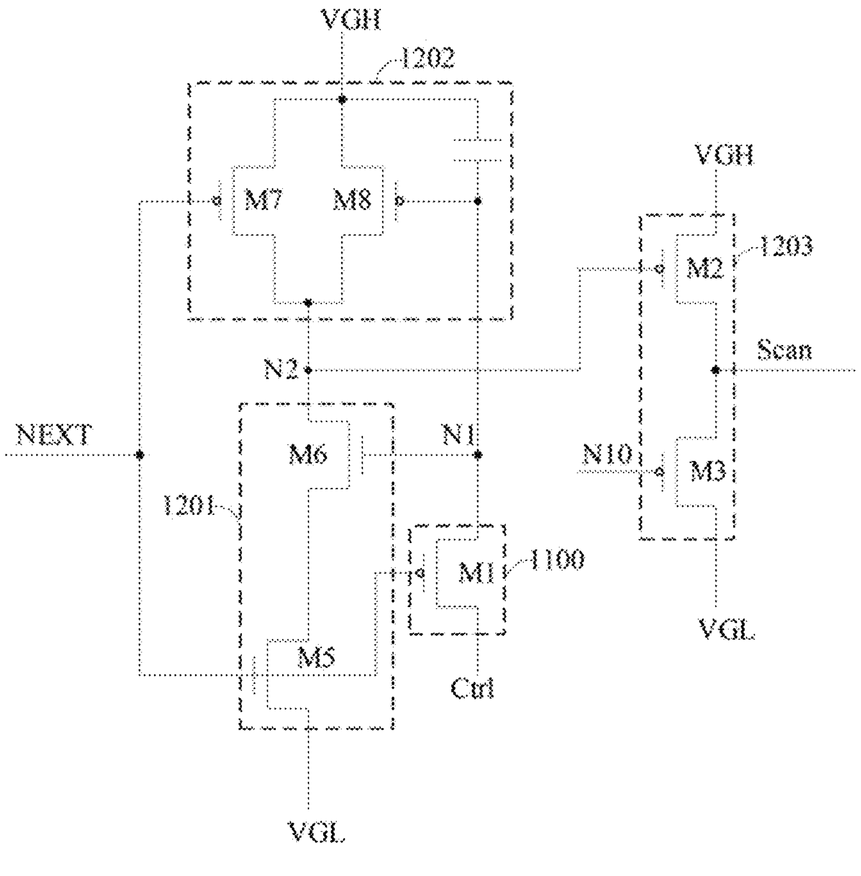
FIG. 17 illustrates another exemplary target gating circuit consistent with various disclosed embodiments in the present disclosure.
Figure 18:
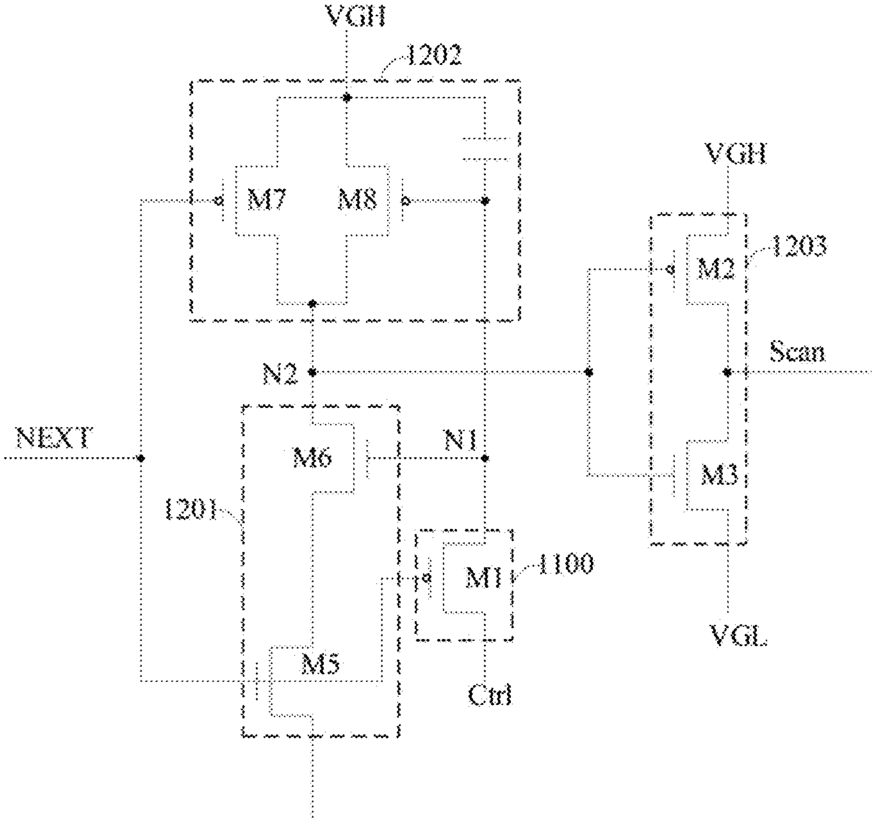
FIG. 18 illustrates another exemplary target gating circuit consistent with various disclosed embodiments in the present disclosure.
Figure 19:
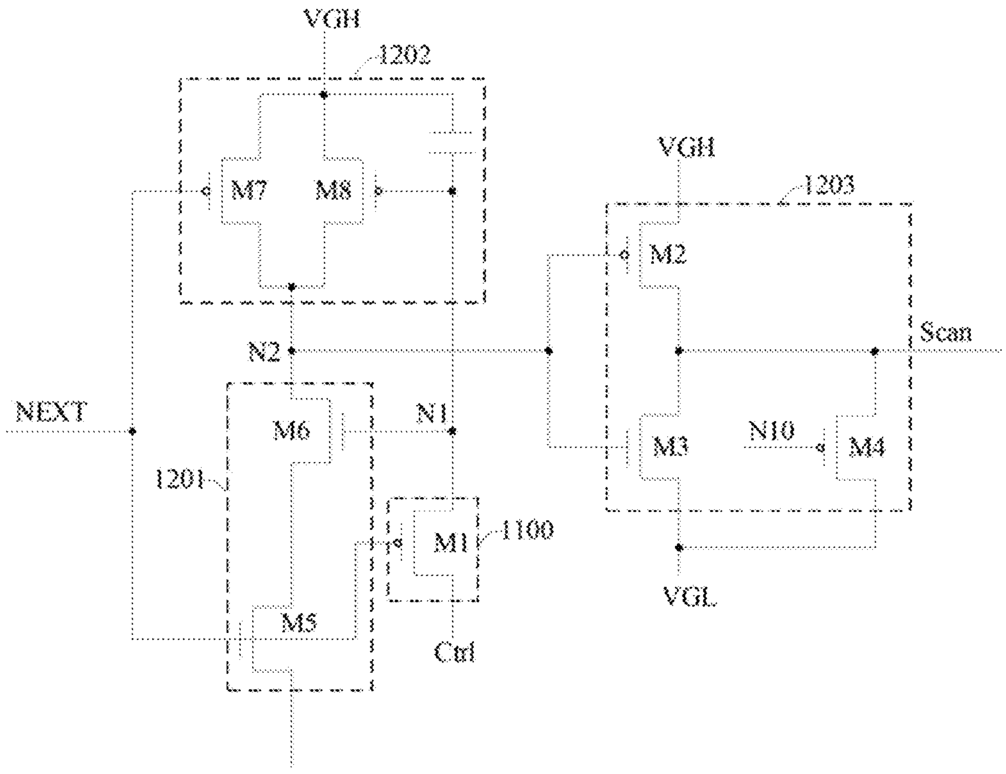
FIG. 19 illustrates another exemplary target gating circuit consistent with various disclosed embodiments in the present disclosure.

In one embodiment shown in FIG. 17 which is a schematic diagram of the structure of a target gating circuit, FIG. 18 which is a schematic diagram of the structure of another target gating circuit, and FIG. 19 which is a schematic diagram of the structure of another target gating circuit, the first gating module 1100 may include a first transistor M1. The gate of the first transistor M1 may be electrically connected to the output terminal NEXT of the first driving circuit 110 at the same level, the first terminal of the first transistor M1 may be the first node N1, and the second terminal of the first transistor M1 may receive the target frequency control signal Ctrl. Exemplarily, the first transistor M1 may include a P-type transistor, for example, the first transistor M1 may include a PMOS or a PTFT.

Taking the target gating circuit including the first gating circuit 120 as an example, the first gating module 1100 in the first gating circuit 120 may include a first transistor M1. The gate of the first transistor M1 may be electrically connected to the output terminal NEXT of the first driving circuit 110 at the same level, the first terminal of the first transistor M1 may be the first node N1, and the second terminal of the first transistor M1 may receive the first frequency control signal Ctrl1. In other embodiments where the target gating circuit includes the second gating circuit 130, the implementation may be similar to the aforementioned target gating circuit including the first gating circuit 120, except that the second electrode of the first transistor M1 of the second gating circuit 130 receives the second frequency control signal Ctrl2, which will not be repeated here.

As shown in FIG. 16 to FIG. 19, in one embodiment, the second gating module 1200 may include a first gating unit 1201, a second gating unit 1202, and a third gating unit 1203. The input terminal of the first gating unit 1201 may be electrically connected to the output terminal NEXT and the first node N1 of the first driving circuit 110 of the same level. The first gating unit 1201 may receive a driving signal SNEXT, a first node signal, and a first power signal VGL. The first gating unit 1201 may be used to control the second node signal of the second node N2. The input terminal of the second gating unit 1202 may be electrically connected to the output terminal NEXT and the first node N1 of the first driving circuit 110 of the same level. The second gating unit 1202 may receive a driving signal SNEXT, a first node signal, and a second power signal VGH. The second gating unit 1202 may be used to control the second node signal. The third gating unit 1203 may be electrically connected to the second node N2. The third gating unit 1203 may receive at least the first power signal VGL, the second power signal VGH, and the second node signal. The third gating unit 1203 may output the target gate control signal. For example, for the first gating circuit 120, its third gating unit 1203 may output the first gate control signal Scan1. For another example, for the second gating circuit 130, its third gating unit 1203 may output the second gate control signal Scan2.

As shown in FIG. 17 to FIG. 19, in one embodiment, the third gating unit 1203 may include a second transistor M2 and a third transistor M3. The first electrode of the second transistor M2 may receive the second power signal VGH. The second electrode of the second transistor M2 may be electrically connected to the first electrode of the third transistor M3 and may output the target gate control signal. For example, for the first gating circuit 120, the second electrode of the second transistor M2 may output the first gate control signal Scan1. For another example, for the second gating circuit 130, the second electrode of the second transistor M2 may output the second gate control signal Scan2. The gate of the second transistor M2 may be electrically connected to the second node N2, and the second electrode of the third transistor M3 may receive the first power signal VGL. Exemplarily, the second transistor M2 may include a P-type transistor, for example, the second transistor M2 may be a PMOS or a PTFT.

As shown in FIG. 17 to FIG. 19, in one embodiment, the third transistor M3 may be a P-type transistor or an N-type transistor. For example, the third transistor M3 may include a PMOS, a PTFT, an NMOS or an NTFT. As shown in FIG. 17, when the third transistor M3 is a P-type transistor, the gate of the third transistor M3 may be electrically connected to the tenth node N10 in the first driving circuit 110 of the same level, and the signal of the tenth node N10 may refer to the relevant description of the first driving circuit 110 below. As shown in FIG. 18 and FIG. 19, when the third transistor M3 is an N-type transistor, the gate of the third transistor M3 may be electrically connected to the gate of the second transistor M2 and the second node N2 respectively. In the application, the type of the third transistor M3 may be set according to the actual scene, and it is not limited here. It can be understood that, in the display panel provided by the present embodiment, the first initialization transistor T1 and the threshold compensation transistor T2 of the pixel circuit may be P-type transistors, and accordingly, the effective pulses of the first gate control signal Scan1 output by the first gating circuit 120 and the second gate control signal Scan2 output by the second gating circuit 130 may be respectively low levels. Selecting the third transistor M3 as an N-type transistor may better transmit low-level signals, which helps to improve the display effect of the display panel.

As shown in FIG. 19, in one embodiment, the third gating unit 1203 may also include a fourth transistor M4. The first electrode of the fourth transistor M4 may be electrically connected to the second electrode of the second transistor M2 and the first electrode of the third transistor M3, and output the target gate control signal. The second electrode of the fourth transistor M4 may receive the first power signal VGL.

The third transistor M3 and the fourth transistor M4 may be of different types. Exemplarily, in one embodiment, the third transistor M3 may be a P-type transistor, and the fourth transistor M4 may be an N-type transistor. In this case, the gate of the third transistor M3 may be electrically connected to the tenth node N10 in the first driving circuit 110 of the same level, and the gate of the fourth transistor M4 may be electrically connected to the gate of the second transistor M2 and the second node N2, respectively. In another exemplary embodiment, as shown in FIG. 19, the third transistor M3 may be an N-type transistor, and the fourth transistor M4 may be a P-type transistor. In this case, the gate of the third transistor M3 may be electrically connected to the gate of the second transistor M2 and the second node N2, respectively, and the gate of the fourth transistor M4 may be electrically connected to the tenth node N10 in the first driving circuit 110 of the same level.

It can be understood that, since the reliability of an N-type transistor may be insufficient, in one embodiment, the third gating unit 1203 may be combined by the third transistor M3 and the fourth transistor M4, that is, the N-type transistor and the P-type transistor, to jointly support the output of the target gate control signal, which may improve the stability of the gate control signal output by the shift register, and help improve the display effect of the display panel.

As shown in FIG. 17 to FIG. 19, in one embodiment, the first gating unit 1201 may include a fifth transistor M5 and a sixth transistor M6. The first electrode of the fifth transistor M5 may be electrically connected to the first electrode of the sixth transistor M6. The second electrode of the fifth transistor M5 may receive the first power signal VGL, and the gate of the fifth transistor M5 may be electrically connected to the output terminal NEXT of the first driving circuit 110 at the same level. The second electrode of the sixth transistor M6 may be electrically connected to the second node N2, and the gate of the sixth transistor M6 may be electrically connected to the first node N1. Exemplarily, in one embodiment, the fifth transistor M5 and the sixth transistor M6 may be N-type transistors, for example, NMOSs or NTFTs.

Figure 20:
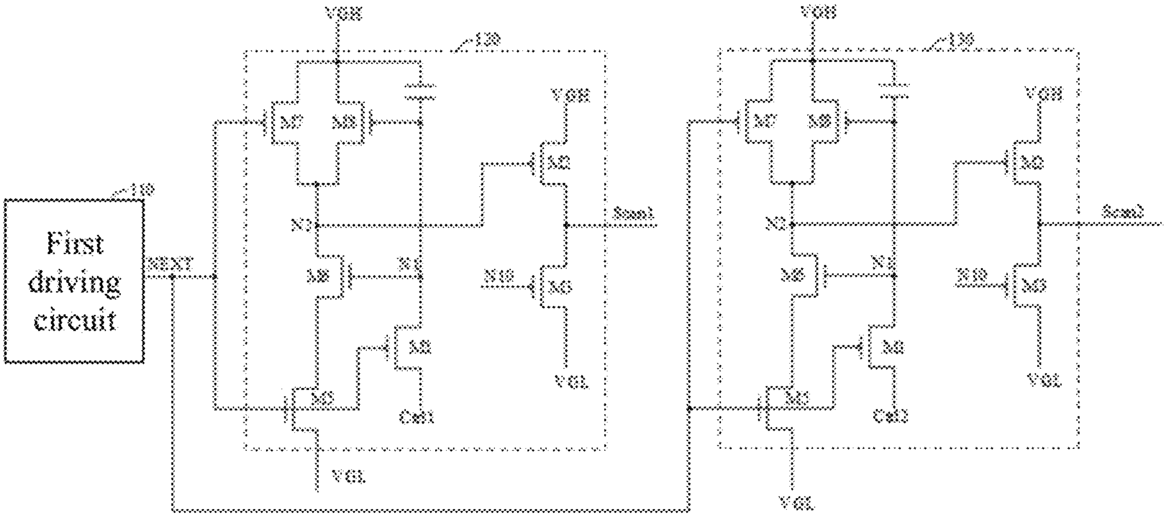
FIG. 20 illustrates another exemplary first shift register consistent with various disclosed embodiments in the present disclosure.

In one embodiment shown in FIG. 20 which is a schematic diagram of the structure of a first shift register 10, for the same first shift register 10, the first gating unit 1201 of the first gating circuit 120 may include a fifth transistor M5 and a sixth transistor M6. In the first gating unit 1201, the first electrode of the fifth transistor M5 may be electrically connected to the first electrode of the sixth transistor M6, and the second electrode of the fifth transistor M5 may receive the first power signal VGL. The gate of the fifth transistor M5 may be electrically connected to the output terminal NEXT of the first driving circuit 110 at the same level. The second electrode of the sixth transistor M6 may be electrically connected to the second node N2, and the gate of the sixth transistor M6 may be electrically connected to the first node N1. The first gating unit 1201 of the second gating circuit 130 may include a fifth transistor M5 and a sixth transistor M6. In the first gating unit 1201, the first electrode of the fifth transistor M5 may be electrically connected to the first electrode of the sixth transistor M6, the second electrode of the fifth transistor M5 may receive the first power signal VGL, and the gate of the fifth transistor M5 may be electrically connected to the output terminal NEXT of the first driving circuit 110 at the same level. The second electrode of the sixth transistor M6 may be electrically connected to the second node N2, and the gate of the sixth transistor M6 may be electrically connected to the first node N1.

Figure 21:
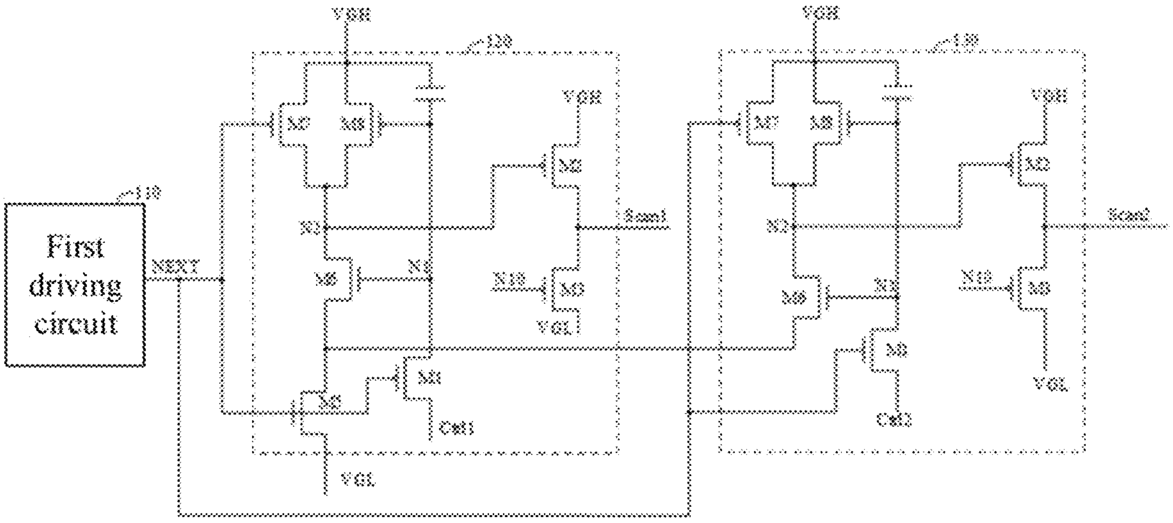
FIG. 21 illustrates another exemplary first shift register consistent with various disclosed embodiments in the present disclosure.

In one embodiment shown in FIG. 21 which is a schematic diagram of the structure of a first shift register 10, in the same first shift register 10, the fifth transistor of the first gating circuit 120 and the fifth transistor of the second gating circuit 130 may be the same transistor. That is, the first shift register 10 may include a fifth transistor M5, In one same first shift register 10, the first electrode of the sixth transistor M6 of the first gating circuit 120 and the first electrode of the sixth transistor M6 of the second gating circuit 130 may be respectively electrically connected to the first electrode of the fifth transistor M5, the second electrode of the fifth transistor M5 may receive the first power signal VGL, the second electrode of the sixth transistor M6 of the first gating circuit 120 may be electrically connected to the second node N2 of the first gating circuit 120, the gate of the sixth transistor M6 of the first gating circuit 120 may be electrically connected to the first node N1 of the first gating circuit 120, the second electrode of the sixth transistor M6 of the second gating circuit 130 may be electrically connected to the second node N2 of the second gating circuit 130, and the gate of the sixth transistor M6 of the second gating circuit 130 may be electrically connected to the first node N1 of the second gating circuit 130. Therefore, the first gating circuit 120 and the second gating circuit 130 in the same first shift register 10 may multiplex the same fifth transistor M5, which reduces the number of transistors and may further achieve a narrow frame.

As shown in FIG. 17 to FIG. 21, in one embodiment, the second gating unit 1202 may include a seventh transistor M7, an eighth transistor M8 and a first capacitor C1. The first electrode of the seventh transistor M7 may be electrically connected to the second electrode of the eighth transistor M8 and the first electrode of the first capacitor C1, and may receive the second power supply signal VGH. The second electrode of the seventh transistor M7 may be electrically connected to the first electrode of the eighth transistor M8 and the second node N2. The gate of the seventh transistor M7 may be electrically connected to the output terminal NEXT of the first driving circuit 110 at the same level. The gate of the eighth transistor M8 may be electrically connected to the second electrode of the first capacitor C1 and the first node N1. The seventh transistor M7 and the eighth transistor M8 may be P-type transistors, for example, they may be P-type polysilicon transistors.

It should be noted that the gating circuits in the aforementioned various shift registers, including the third gating circuit 320, the fourth gating circuit 420, the fifth gating circuit 520 and the sixth gating circuit 620, may all adopt the 7T1C or 8T1C structure provided in FIG. 17 to FIG. 21, which will not be repeated here.

Figure 22:
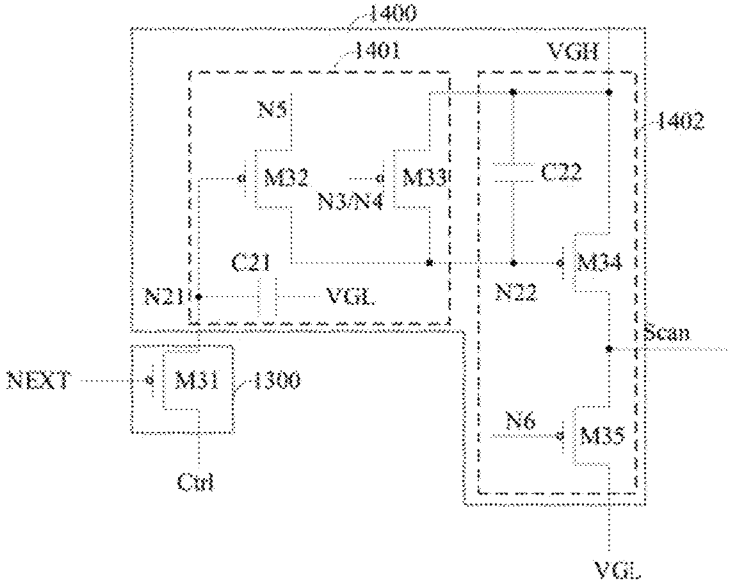
FIG. 22 illustrates another exemplary target gating circuit consistent with various disclosed embodiments in the present disclosure.
Figure 23:
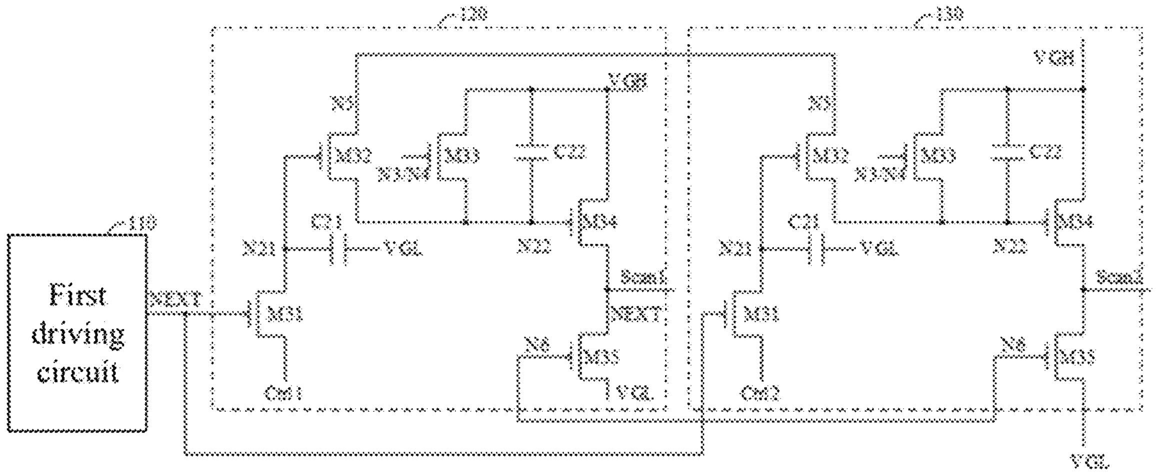
FIG. 23 illustrates another exemplary first shift register consistent with various disclosed embodiments in the present disclosure.

In one embodiment shown in FIG. 22 which is a schematic diagram of the structure of a target driving circuit and FIG. 23 which is a schematic diagram of the structure of a first shift register, the target gating circuit may be at least one of the first gating circuit 120 and the second gating circuit 130. The target gating circuit may include a third gating module 1300 and a fourth gating module 1400. The third gating module 1300 may be electrically connected to the output terminal NEXT of the first driving circuit 110 at the same level. The third gating module 1300 may receive the driving signal SNEXT and the target frequency control signal Ctrl output by the first driving circuit 110 respectively. The third gating module 1300 may be used to control the first gating signal of the first gating node N21. The target frequency control signal Ctrl may include at least one of the first frequency control signal Ctrl1 or the second frequency control signal Ctrl2. The fourth gating module 1400 may receive at least the driving signal SNEXT, the first gating signal, the first power supply signal VGL, or the second power supply signal VGH. The second gating module 1200 may output the target gate control signal. The target gate control signal may include at least one of the first gate control signal Scan1 or the second gate control signal Scan2.

Taking the target gating circuit including the first gating circuit 120 as an example, the first gating circuit 120 may include a third gating module 1300 and a fourth gating module 1400. The third gating module 1300 may be electrically connected to the output terminal NEXT of the first driving circuit 110 at the same level. The third gating module 1300 may receive the driving signal SNEXT and the first frequency control signal Ctrl1 output by the first driving circuit 110 respectively. The third gating module 1300 may be used to control the first gating signal of the first gating node N21. The fourth gating module 1400 may receive at least the driving signal SNEXT, the first gating signal, the first power supply signal VGL or the second power supply signal VGH, and the fourth gating module 1400 may output the first gate control signal Scan1.

When the target gating circuit includes the second gating circuit 130, the implementation may be similar to the aforementioned target gating circuit including the first gating circuit 120, except that the target frequency control signal Ctrl may include the second frequency control signal Ctrl2 and the target gate control signal may include the second gate control signal Scan2, which will not be repeated here.

As shown in FIG. 22 and FIG. 23, in one embodiment, the third gating module 1300 may include a first gating transistor M31. The gate of the first gating transistor M31 may be electrically connected to the output terminal of the first driving circuit at the same level, the first electrode of the first gating transistor M31 may be the first gating node N21, and the second electrode of the first gating transistor M31 may receive the target frequency control signal. Exemplarily, in one embodiment, the first gating transistor M31 may include a P-type transistor, for example, the first transistor M1 may include a PMOS or a PTFT.

Taking the target gating circuit including the first gating circuit 120 as an example, the third gating module 1300 in the first gating circuit 120 may include a first gating transistor M31. The gate of the first gating transistor M31 may be electrically connected to the output terminal of the first driving circuit at the same level, the first electrode of the first gating transistor M31 may be the first gating node N21, and the second electrode of the first gating transistor M31 may receive the target frequency control signal Ctrl1. In another embodiment, the target gating circuit may include the second gating circuit 130, and the implementation may be similar to the aforementioned target gating circuit including the first gating circuit 120, except that the second electrode of the first gating transistor M31 of the second gating circuit 130 receives the second frequency control signal Ctrl2, which will not be repeated here.

As shown in FIG. 22 and FIG. 23, in one embodiment, the fourth gating module 1400 may include a fourth gating unit 1401 and a fifth gating unit 1402. The fourth gating unit 1401 may be electrically connected to the first gating node N21, the first driving node and the second driving node of the first driving circuit 110 of the same level. The fourth gating unit 1401 may receive the second power supply signal VGH. The fourth gating unit 1401 may be used to control the second gating signal of the second gating node N22N21. The fifth gating unit 1402 may be electrically connected to the second gating node N22N21 and the third driving node of the first driving circuit 110 of the same level. The fifth gating unit 1402 may output the target gate control signal. For example, for the first gating circuit 120, its fifth gating unit 1402 may output the first gate control signal Scan1. For another example, for the second gating circuit 130, its fifth gating unit 1402 may output the second gate control signal Scan2. The first driving node may be the fifth node N5 of the first driving circuit, the second driving node may be the third node N3 or the fourth node N4 of the first driving circuit 110, and the third driving node may be the sixth node N6 of the first driving circuit. For details, please refer to the following related content of the first driving circuit.

As shown in FIG. 22 and FIG. 23, in one embodiment, the fourth gating unit 1401 may include a second gating transistor M32, a third gating transistor M33 and a first gating capacitor C21. The first electrode of the second gating transistor M32 may be electrically connected to the first driving node. The second electrode of the second gating transistor M32 may be electrically connected to the second electrode of the third gating transistor M33 and the second gating node N22 respectively. The gate of the second gating transistor M32 may be electrically connected to the first electrode of the first gating capacitor C21 and the first gating node N21 respectively. The second electrode of the first gating capacitor C21 may receive the first power supply signal VGL. The first electrode of the second gating transistor M32 may receive the second power supply signal VGH, and the gate of the second gating transistor M32 may be electrically connected to the second driving node. The second gating transistor M32 and the third gating transistor M33 may be respectively P-type transistors, for example, they can be PMOSs or PTFTs.

As shown in FIG. 22 and FIG. 23, in one embodiment, the fifth gating unit 1402 may include a fourth gating transistor M34, a fifth gating transistor M35 and a second gating capacitor C22. The first electrode of the fourth gating transistor M34 may be electrically connected to the first electrode of the second gating capacitor C22 and may receive the second power supply signal VGH. The second electrode of the fourth gating transistor M34 may be electrically connected to the first electrode of the fifth gating transistor M35 and outputs the target gate control signal Scan. The gate of the fourth gating transistor M34 may be electrically connected to the second electrode of the first gating capacitor C21 and the second gating node N22 respectively. The second electrode of the fifth gating transistor M35 may receive the first power supply signal VGL, and the gate of the fifth gating transistor M35 may be electrically connected to the third driving node of the first driving circuit 110 of the same level to receive the second power supply signal. The fourth gating transistor M34 and the fifth gating transistor M35 may be respectively P-type transistors, for example, they can be PMOSs or PTFTs.

Various gating circuits in various shift registers, such as the third gating circuit 320, the fourth gating circuit 420, the fifth gating circuit 520, or the sixth gating circuit 620, may also adopt the 5T2C structure shown in FIG. 22 and FIG. 23.

Figure 24:
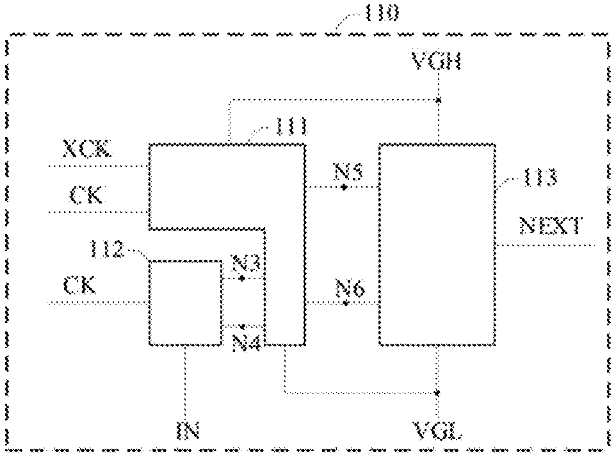
FIG. 24 illustrates an exemplary first driving circuit consistent with various disclosed embodiments in the present disclosure.

In one embodiment shown in FIG. 24 which is a schematic diagram of the structure of a first driving circuit 110, the first driving circuit 110 may include an input module 111, a control module 112 and an output module 113. The input module 111 may receive an input signal IN and a first clock signal CK respectively. The input module 111 may be used to control a third node signal of a third node N3 and a fourth node signal of a fourth node N4. The control module 112 may receive the third node signal, the fourth node signal, the first clock signal CK, the second clock signal XCK, the first power signal VGL and the second power signal VGH respectively. The control module 112 may be used to control a fifth node signal of a fifth node N5 and a sixth node signal of a sixth node N6. The output module 113 may receive the fifth node signal, the sixth node signal, the first power signal VGL and the second power signal VGH respectively. The output module 113 may output a driving signal SNEXT.

Figure 25:
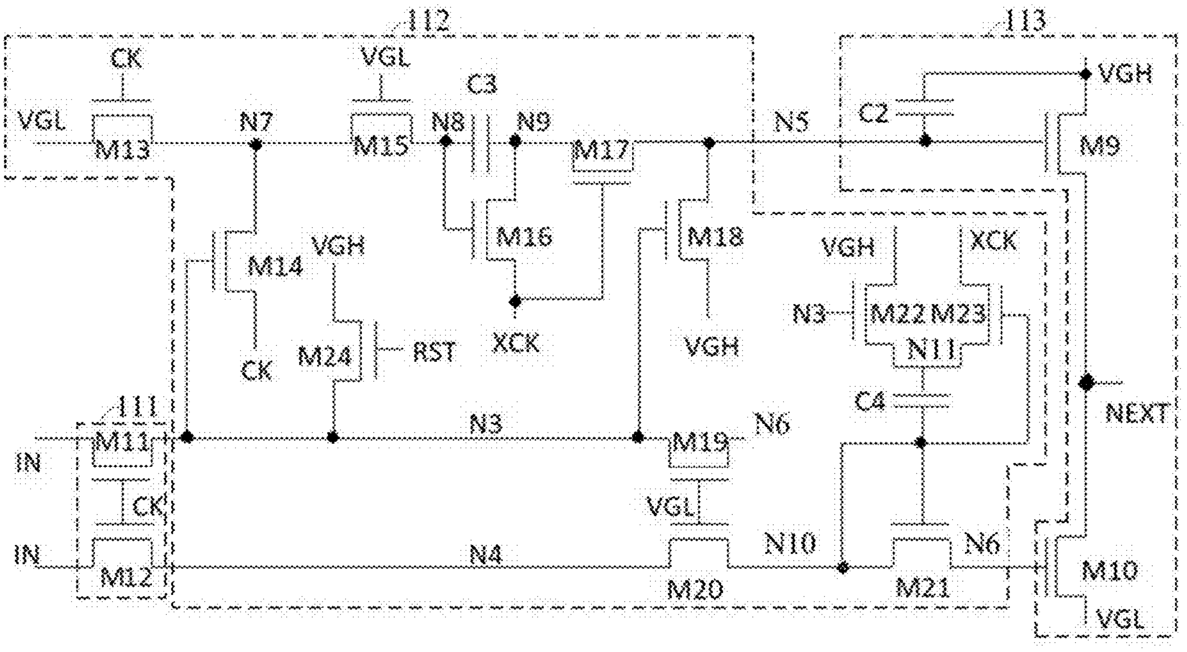
FIG. 25 illustrates another exemplary first driving circuit consistent with various disclosed embodiments in the present disclosure.

In one embodiment shown in FIG. 25 which is a schematic diagram of the structure of a first driving circuit 110, the output module 113 may include a ninth transistor M9, a tenth transistor M10, and a second capacitor C2. The first electrode of the ninth transistor M9 may receive the second power signal VGH, the first electrode of the ninth transistor M9 may be electrically connected to the first electrode of the second capacitor C2, the second electrode of the ninth transistor M9 may be electrically connected to the first electrode of the tenth transistor M10 and output the drive signal SNEXT, and the gate of the ninth transistor M9 may be electrically connected to the second electrode of the second capacitor C2 and the fifth node N5, respectively. The second electrode of the tenth transistor M10 may receive the first power signal VGL, and the gate of the tenth transistor M10 may be electrically connected to the sixth node N6.

In one embodiment shown in FIG. 23, the input module 111 may include an eleventh transistor M11 and a twelfth transistor M12. The first electrode of the eleventh transistor M11 may be electrically connected to the second electrode of the twelfth transistor M12 and receive the input signal IN, and the second electrode of the eleventh transistor M11 may be electrically connected to the third node N3. The gate of the eleventh transistor M11 and the gate of the twelfth transistor M12 may be electrically connected and receive the first clock signal CK. The first electrode of the twelfth transistor M12 may be electrically connected to the fourth node N4.

In one embodiment shown in FIG. 25, the control module 112 may include a thirteenth transistor M13, a fourteenth transistor M14, a fifteenth transistor M15, a sixteenth transistor M16, a seventeenth transistor M17, an eighteenth transistor M18, a nineteenth transistor M19, a twentieth transistor M20, a twenty-first transistor M21, a twenty-second transistor M22, a twenty-third transistor M23, a twenty-fourth transistor M24, a third capacitor C3 and a fourth capacitor C4.

The first electrode of the thirteenth transistor M13 may be electrically connected to the seventh node N7, the second electrode of the thirteenth transistor M13 may receive the first power signal VGL, and the gate of the thirteenth transistor M13 may receive the first clock signal CK. The first electrode of the fourteenth transistor M14 may be electrically connected to the seventh node N7, the second electrode of the fourteenth transistor M14 may receive the first clock signal CK, and the gate of the fourteenth transistor M14 may be electrically connected to the third node N3. The first electrode of the fifteenth transistor M15 may be electrically connected to the eighth node N8, the first electrode of the fifteenth transistor M15 may be electrically connected to the seventh node N7, and the gate of the fifteenth transistor M15 may receive the first power signal VGL.

The first electrode of the third capacitor C3 may be electrically connected to the eighth node N8, and the second electrode of the third capacitor C3 may be electrically connected to the ninth node N9. The first electrode of the sixteenth transistor M16 may be electrically connected to the ninth node N9, the second electrode of the sixteenth transistor M16 may receive the second clock signal XCK, and the gate of the sixteenth transistor M16 may be electrically connected to the eighth node N8. The first electrode of the seventeenth transistor M17 may be electrically connected to the ninth node N9, the second electrode of the seventeenth transistor M17 may be electrically connected to the fifth node N5, and the gate of the seventeenth transistor M17 may receive the second clock signal XCK. The first electrode of the eighteenth transistor M18 may be electrically connected to the fifth node N5, the second electrode of the eighteenth transistor M18 may receive the second power supply signal VGH, and the gate of the eighteenth transistor M18 may be electrically connected to the third node N3.

The first electrode of the nineteenth transistor M19 may be electrically connected to the third node N3, the second electrode of the nineteenth transistor M19 may be electrically connected to the sixth node N6, and the gate of the nineteenth transistor M19 may receive the first power supply signal VGL. The first electrode of the twentieth transistor M20 may be electrically connected to the tenth node N10, the second electrode of the twentieth transistor M20 may be electrically connected to the fourth node N4, and the gate of the twentieth transistor M20 may receive the first power supply signal VGL. The first electrode of the twenty-first transistor M21 may be electrically connected to the sixth node N6, and the second electrode and the gate of the twenty-first transistor M21 may be electrically connected to the tenth node N10, respectively.

The first electrode of the fourth capacitor C4 may be electrically connected to the tenth node N10, and the second electrode of the fourth capacitor C4 may be electrically connected to the eleventh node N11. The first electrode of the twenty-second transistor M22 may receive the second power signal VGH, the second electrode of the twenty-second transistor M22 may be electrically connected to the eleventh node N11, and the gate of the twenty-second transistor M22 may be electrically connected to the seventh node N7. The first electrode of the twenty-third transistor M23 may be electrically connected to the eleventh node N11, the second electrode of the twenty-third transistor M23 may receive the second clock signal XCK, and the gate of the twenty-third transistor M23 may be electrically connected to the tenth node N10. The first electrode of the twenty-fourth transistor M24 may be electrically connected to the third node N3, the second electrode of the twenty-fourth transistor M24 may receive the second power signal VGH, and the gate of the twenty-fourth transistor M24 may receive the reset signal RST.

Various driving circuits in various shift registers, such as the second driving circuit 310, the third driving circuit 410, the fourth driving circuit 510, or the fifth driving circuit 610, may also adopt the 16T3C structure shown in FIG. 23.

The present disclosure also provides a display device. In one embodiment shown in FIG. 26, the display device 10000 may include any display panel 1 provided by various embodiments of the present disclosure. The display device 10000 may also have the beneficial effects of the display panel 1 in the above embodiments. The similarities may be understood by referring to the above explanation of the display panel 1, and will not be repeated below.

Figure 26:
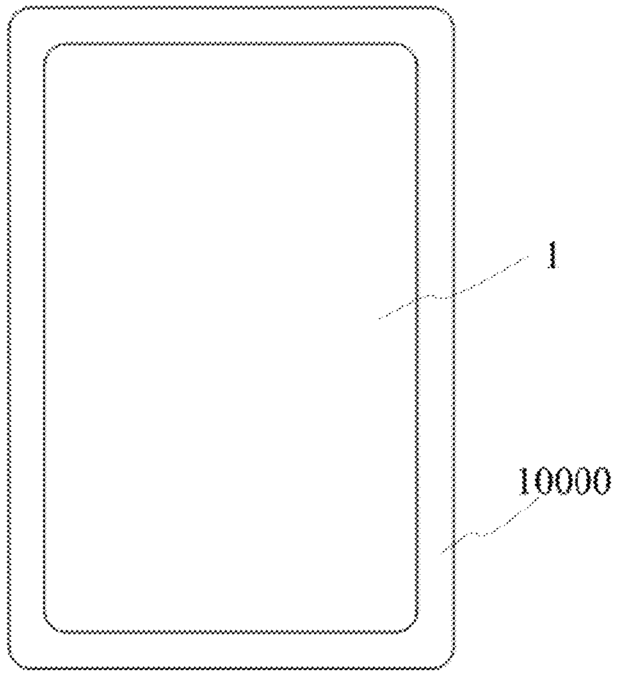
FIG. 26 illustrates an exemplary display device consistent with various disclosed embodiments in the present disclosure.

The display device 10000 provided in the embodiment of the present disclosure may be a mobile phone as shown in FIG. 26, or any electronic product with a display function, including but not limited to: televisions, laptops, desktop displays, tablet computers, digital cameras, smart bracelets, smart glasses, vehicle displays, industrial control equipment, medical display screens, touch interactive terminals, etc., and the embodiments of the present disclosure do not specifically limit this.

In the present disclosure, relational terms such as "first" and "second" are only used to distinguish one entity or operation from another entity or operation, and do not necessarily require or imply that there is a relationship between these entities or operations. There is no such actual relationship or sequence. Furthermore, the terms "comprises", "include", or any other variations thereof are intended to cover a non-exclusive inclusion such that a process, method, article, or apparatus that includes a list of elements includes not only those elements, but also those not expressly listed, or elements inherent to the process, method, article or equipment. Without further limitation, an element defined by the statement "comprises a . . . " does not exclude the presence of additional identical elements in a process, method, article, or apparatus that includes the stated element.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display panel, comprising a plurality of cascaded first shift registers, wherein:

one of the plurality of first shift registers includes a first driving circuit, a first gating circuit and a second gating circuit, wherein:

an output terminal of the i-th-level first driving circuit is electrically connected to an input terminal of the (i+1)-th-level first driving circuit, an input terminal of the i-th-level first gating circuit, and an input terminal of the i-th-level second gating circuit, respectively, wherein i≥1;

one first gating circuit outputs a first gate control signal, and one second gating circuit outputs a second gate control signal;

in one first shift registers of a same level, output times of effective pulses of the first gate control signal and the second gate control signal are different; and the first gating circuit receives a driving signal and a first frequency control signal output by the first driving circuit of the same level, the second gating circuit receives the driving signal and a second frequency control signal output by the first driving circuit of the same level, and effective pulses of the first frequency control signal and the second frequency control signal do not overlap.

2. A display panel, comprising a plurality of cascaded first shift registers and a plurality of pixel circuit groups, wherein:

one of the plurality of first shift registers includes a first driving circuit, a first gating circuit and a second gating circuit, wherein:

an output terminal of the i-th-level first driving circuit is electrically connected to an input terminal of the (i+1)-th-level first driving circuit, an input terminal of the i-th-level first gating circuit, and an input terminal of the i-th-level second gating circuit, respectively, wherein i≥1;

one first gating circuit outputs a first gate control signal, and one second gating circuit outputs a second gate control signal; and in one first shift registers of a same level, output times of effective pulses of the first gate control signal and the second gate control signal are different; and one of the plurality of pixel circuit groups includes at least one row of pixel circuits, wherein:

a first control terminal of the j-th pixel circuit group is electrically connected to an output terminal of the k-th-level first gating circuit, and a second control terminal of the j-th pixel circuit group is electrically connected to an output terminal of the (k+N)-th-level second gating circuit, wherein j, k, N≥1; and within a display cycle of the display panel, for one same pixel circuit, an effective pulse start time at which the first control terminal receives the first gate control signal is different from an effective pulse start time at which the second control terminal receives the second gate control signal.

3. The display panel according to claim 2, further including N cascaded second shift registers, wherein:

one of the N second shift registers includes a second drive circuit and a third gating circuit; wherein:

an input terminal of the first-level second drive circuit receives a start signal, an output terminal of the p-th-level second drive circuit is electrically connected to an input terminal of the (p+1)-th-level second drive circuit and an input terminal of the p-th-level third gating circuit, respectively, wherein 1≤p<N;

an output terminal of the N-th-level second drive circuit is electrically connected to input terminals of the N-th-level third gating circuit and the first-level first drive circuit, respectively; and one third gating circuit outputs a third gate control signal, wherein a first control terminal of the q-th pixel circuit group is electrically connected to an output terminal of the q-th-level third gating circuit, wherein 1≤q≤N and k=j−N>0.

4. The display panel according to claim 3, wherein:
in first shift registers from the (M−N+1)-th-level to the M-th-level, an output terminal of at least one of the first gating circuits is in a floated state, and/or an output terminal of at least one of the first gating circuits is electrically connected to an output terminal of the first driving circuit of the same level, wherein M represents the number of the plurality of first shift registers.

5. The display panel according to claim 2, further including N cascaded third shift registers, wherein:
one of the N third shift registers includes a third drive circuit and a fourth gating circuit, wherein:
an output terminal of the p-th-level third drive circuit is electrically connected to an input terminal of the (p+1)-th-level third drive circuit and an input terminal of the p-th-level fourth gating circuit respectively, wherein 1≤p≤N;
one fourth gating circuit outputs a fourth gate control signal;
the input terminal of the first-level first drive circuit receives a start signal, and an output terminal of the M-th-level first drive circuit is also electrically connected to an input terminal of the first-level third drive circuit, wherein M represents the number of the plurality of first shift registers; and
a second control terminal of the q-th pixel circuit group is electrically connected to an output terminal of the (q-M)-th-level fourth gating circuit, wherein q>M and 1≤k=j≤M.

6. The display panel according to claim 2, further including N cascaded fourth shift registers and N cascaded fifth shift registers, wherein:
one of the N fourth shift registers includes a fourth drive circuit and a fifth gating circuit;
an output terminal of the p-th-level fourth drive circuit is electrically connected to an input terminal of the (p+1)-th-level fourth drive circuit and an input terminal of the p-th-level fifth gating circuit respectively; and an output terminal of the N-th-level fourth drive circuit is also electrically connected to an input terminal of the first-level first drive circuit, wherein 1≤p≤N;
an input terminal of the first-level fourth drive circuit receives a start signal, and one fifth gating circuit outputs a fifth gate control signal;
one of the N fifth shift registers includes a fifth drive circuit and a sixth gating circuit;
an output terminal of the r-th-level fifth drive circuit is electrically connected to an input terminal of the (r+1)-th-level fifth driving circuit and an input terminal of the r-th-level sixth gating circuit, respectively, wherein 1≤r≤N;
the output terminal of the M-th-level first driving circuit is also electrically connected to the input terminal of the first-level fifth driving circuit, and the M-th-level first driving circuit is the last level in the plurality of first shift register;
one sixth gating circuit outputs a sixth gate control signal;
the first control terminal of the q-th pixel circuit group is electrically connected to the output terminal of the q-th-level fifth gating circuit, wherein 1≤q≤N and 0<k=j−N≤M; and
the second control terminal of the s-th pixel circuit group is electrically connected to the output terminal of the (s−M)-th-level sixth gating circuit, wherein M+N<s≤M+2N.

7. The display panel according to claim 2, wherein:
k=j≥1.

8. The display panel according to claim 2, wherein:
in one display cycle of the display panel, for one same pixel circuit, the effective pulse start time difference between the gate control signal received by the first control terminal and the gate control signal received by the second control terminal is a*H*N; wherein a is the number of pixel circuit rows included in each pixel circuit group, H is the time for the display panel to refresh a row of pixel circuits, and N≥1.

9. The display panel according to claim 2, wherein:
one pixel circuit includes a driving transistor, a first initialization transistor and a threshold compensation transistor, wherein:
a first electrode of the first initialization transistor is electrically connected to a first initialization signal terminal;
a second electrode of the first initialization transistor is electrically connected to a gate of the driving transistor and a first electrode of the threshold compensation transistor respectively;
a gate of the first initialization transistor is the first control terminal of the pixel circuit;
a second electrode of the threshold compensation transistor is electrically connected to a first electrode of the driving transistor; and
a gate of the threshold compensation transistor is the second control terminal of the pixel circuit.

10. The display panel according to claim 9, wherein:
the first initialization transistor and the threshold compensation transistor are N-type transistors, wherein: effective pulses of the gate control signals respectively received by the first initialization transistor and the threshold compensation transistor are of a first level, ineffective pulses of the gate control signals respectively received by the first initialization transistor and the threshold compensation transistor are of a second level, and the first level is smaller than the second level.

11. The display panel according to claim 9, wherein:
one first gating circuit receives a driving signal and a first frequency control signal output by one first driving circuit of the same level, and the effective pulses of the driving signal and the first frequency control signal overlap;
one second gating circuit receives a driving signal and a second frequency control signal output by one first driving circuit of the same level, and the effective pulses of the driving signal and the second frequency control signal overlap; and
the effective pulses of the first frequency control signal and the second frequency control signal do not overlap.

12. The display panel according to claim 11, wherein:
a target gating circuit includes at least one of the first gating circuit and the second gating circuit;
the target gating circuit includes: a first gating module and a second gating module;
the first gating module is electrically connected to the output terminal of the first driving circuit of the same level;
the first gating module receives the driving signal and the target frequency control signal respectively;
the first gating module is used to control a first node signal of a first node;
the target frequency control signal includes at least one of the first frequency control signal and the second frequency control signal;

the second gating module receives the driving signal, the first node signal, the first power supply signal and the second power supply signal respectively;

the second gating module outputs a target gate control signal; and the target gate control signal includes at least one of the first gate control signal and the second gate control signal.

13. The display panel according to claim 12, wherein:

the first gating module includes a first transistor, wherein: a gate of the first transistor is electrically connected to an output terminal of the first driving circuit of the same level, a first electrode of the first transistor is the first node, and a second electrode of the first transistor receives the target frequency control signal.

14. The display panel according to claim 12, wherein the second gating module includes:

a first gating unit, wherein: an input terminal of the first gating unit is electrically connected to the output terminal of the first driving circuit of the same level and the first node respectively, the first gating unit receives the driving signal, the first node signal and the first power signal, and the first gating unit is used to control the second node signal of the second node;

a second gating unit, wherein: an input terminal of the second gating unit is electrically connected to the output terminal of the first driving circuit of the same level and the first node respectively; the second gating unit receives the driving signal, the first node signal and the second power signal; and the second gating unit is used to control the second node signal; and a third gating unit, wherein the third gating unit is electrically connected to the second node; the third gating unit receives at least the first power signal, the second power signal and the second node signal; and the third gating unit outputs the target gate control signal.

15. The display panel according to claim 14, wherein:

the third gating unit includes a second transistor and a third transistor, wherein:

a first electrode of the second transistor receives the second power supply signal;

a second electrode of the second transistor is electrically connected to a first electrode of the third transistor and outputs the target gate control signal;

a gate of the second transistor is electrically connected to the second node; and a second electrode of the third transistor receives the first power supply signal.

16. The display panel according to claim 15, wherein:

the third transistor is a P-type transistor or an N-type transistor.

17. The display panel according to claim 15, wherein:

the third gating unit also includes a fourth transistor, wherein:

a first electrode of the fourth transistor is electrically connected to the second electrode of the second transistor and the first electrode of the third transistor, and outputs the target gate control signal;

a second electrode of the fourth transistor receives the first power supply signal;

a gate of the fourth transistor is electrically connected to the gate of the second transistor and the gate of the third transistor, respectively; and the third transistor and the fourth transistor are of different types.

18. The display panel according to claim 14, wherein:

the first gating unit includes a fifth transistor and a sixth transistor, wherein:

a first electrode of the fifth transistor is electrically connected to a first electrode of the sixth transistor;

a second electrode of the fifth transistor receives the first power supply signal;

a gate of the fifth transistor is electrically connected to the output terminal of the first driving circuit of the same level;

a second electrode of the sixth transistor is electrically connected to the second node; and a gate of the sixth transistor is electrically connected to the first node.

19. The display panel according to claim 18, wherein:

in one same first shift register, the fifth transistor of the first gating circuit and the fifth transistor of the second gating circuit are the same transistor.

20. The display panel according to claim 14, wherein:

the second gating unit includes a seventh transistor, an eighth transistor and a first capacitor, wherein:

a first electrode of the seventh transistor is electrically connected to a second electrode of the eighth transistor and a first electrode of the first capacitor, respectively, and receives the second power supply signal;

a second electrode of the seventh transistor is electrically connected to the first electrode of the eighth transistor and the second node, respectively;

a gate of the seventh transistor is electrically connected to the output terminal of the first driving circuit of the same level; and a gate of the eighth transistor is electrically connected to the second electrode of the first capacitor and the first node, respectively.

21. The display panel according to claim 11, wherein:

a target gating circuit includes at least one of the first gating circuit and the second gating circuit;

the target gating circuit includes: a third gating module and a fourth gating module;

the third gating module is electrically connected to the output terminal of the first driving circuit at the same level;

the third gating module receives the driving signal and the target frequency control signal respectively;

the third gating module is used to control the first gating signal of the first gating node;

the target frequency control signal includes at least one of the first frequency control signal and the second frequency control signal;

the fourth gating module at least receives the driving signal, the first gating signal, the first power supply signal and the second power supply signal;

the fourth gating module outputs a target gate control signal; and the target gate control signal includes at least one of the first gate control signal and the second gate control signal.

22. The display panel according to claim 21, wherein:

the third gating module includes a first gating transistor;

a gate of the first gating transistor is electrically connected to the output terminal of the first driving circuit at the same level;

a first electrode of the first gating transistor is the first gating node; and a second electrode of the first gating transistor receives the target frequency control signal.

23. The display panel according to claim 21, wherein: the fourth gating module includes:

a fourth gating unit, electrically connected to the first gating node, the first driving node and the second driving node of the first driving circuit at the same level, respectively, wherein: the fourth gating unit receives the second power supply signal and is used to control the second gating signal of the second gating node; and a fifth gating unit, electrically connected to the second gating node and the third driving node of the first driving circuit at the same level, respectively, wherein: the fifth gating unit receives the first power supply signal and the second power supply signal, respectively, and outputs the target gate control signal.

24. The display panel according to claim 23, wherein: the fourth gating unit includes a second gating transistor, a third gating transistor and a first gating capacitor;

a first electrode of the second gating transistor is electrically connected to the first driving node;

a second electrode of the second gating transistor is electrically connected to the second electrode of the third gating transistor and the second gating node respectively;

a gate of the second gating transistor is electrically connected to a first electrode of the first gating capacitor and the first gating node respectively;

a second electrode of the first gating capacitor receives the first power supply signal;

the first electrode of the second gating transistor receives the second power supply signal; and a gate of the second gating transistor is electrically connected to the second driving node.

25. The display panel according to claim 23, wherein: the fifth gating unit includes a fourth gating transistor, a fifth gating transistor and a second gating capacitor;

a first electrode of the fourth gating transistor is electrically connected to the first electrode of the second gating capacitor and receives the second power supply signal;

a second electrode of the fourth gating transistor is electrically connected to the first electrode of the fifth gating transistor and outputs the target gate control signal;

a gate of the fourth gating transistor is electrically connected to a second electrode of the first gating capacitor and the second gating node respectively;

a second electrode of the fifth gating transistor receives the first power supply signal; and a gate of the fifth gating transistor is electrically connected to the third driving node of the first driving circuit at the same level to receive the second power supply signal.

26. The display panel according to claim 1, wherein: the display panel has a display area and a non-display area, wherein: the non-display area includes a first non-display area and a second non-display area;

the first non-display area, the display area and the second non-display area are arranged along a first direction;

the first driving circuit and the first gating circuit are respectively located in the first non-display area, and the second gating circuit is located in the second non-display area; and the display panel also includes a gating signal routing, wherein: the gating signal routing is located in the display area, and the second gating circuit is electrically connected to the first driving circuit through the gating signal routing.

27. A display device comprising a display panel, wherein: the display panel includes a plurality of cascaded first shift registers, wherein:

one of the plurality of first shift registers includes a first driving circuit, a first gating circuit and a second gating circuit, wherein:

an output terminal of the i-th-level first driving circuit is electrically connected to an input terminal of the (i+1)-th-level first driving circuit, an input terminal of the i-th-level first gating circuit, and an input terminal of the i-th-level second gating circuit, respectively, wherein $i \geq 1$;

one first gating circuit outputs a first gate control signal, and one second gating circuit outputs a second gate control signal;

in one first shift registers of a same level, output times of effective pulses of the first gate control signal and the second gate control signal are different; and the first gating circuit receives a driving signal and a first frequency control signal output by the first driving circuit of the same level, the second gating circuit receives the driving signal and a second frequency control signal output by the first driving circuit of the same level, and effective pulses of the first frequency control signal and the second frequency control signal do not overlap.

* * * * *